US011514632B2

(12) United States Patent
Russell et al.

(10) Patent No.: US 11,514,632 B2
(45) Date of Patent: Nov. 29, 2022

(54) MODIFYING NEURAL NETWORKS FOR SYNTHETIC CONDITIONAL DIGITAL CONTENT GENERATION UTILIZING CONTRASTIVE PERCEPTUAL LOSS

(71) Applicant: Adobe Inc., San Jose, CA (US)

(72) Inventors: Bryan Russell, San Francisco, CA (US); Taesung Park, Albany, CA (US); Richard Zhang, San Francisco, CA (US); Junyan Zhu, Cambridge, MA (US); Alexander Andonian, Cambridge, MA (US)

(73) Assignee: Adobe Inc., San Jose, CA (US)

( * ) Notice: Subject to any disclaimer, the term of this patent is extended or adjusted under 35 U.S.C. 154(b) by 1 day.

(21) Appl. No.: 17/091,440

(22) Filed: Nov. 6, 2020

(65) Prior Publication Data

US 2022/0148242 A1 May 12, 2022

(51) Int. Cl.
*G09G 5/00* (2006.01)
*G06T 11/60* (2006.01)
*G06N 3/04* (2006.01)

(52) U.S. Cl.
CPC ............ *G06T 11/60* (2013.01); *G06N 3/0454* (2013.01)

(58) Field of Classification Search
CPC ................. G09G 5/14; G09G 2340/10; G09G 2340/125; G06T 11/60; G06T 15/503
USPC .......................................................... 345/629
See application file for complete search history.

(56) References Cited

U.S. PATENT DOCUMENTS

| 2019/0080205 | A1* | 3/2019 | Kaufhold | G06N 3/0472 |
| 2020/0372370 | A1* | 11/2020 | Donahue | G06N 3/084 |
| 2021/0217181 | A1* | 7/2021 | Tyan | G06K 9/46 |
| 2021/0335029 | A1* | 10/2021 | Kowalski | G06T 9/002 |

OTHER PUBLICATIONS

J. Deng, W. Dong, R. Socher, L.-J. Li, K. Li, and L. Fei-Fei. Imagenet: A large-scale hierarchical image database. In 2009 IEEE conference on computer vision and pattern recognition, pp. 248-255. Ieee, 2009.

(Continued)

*Primary Examiner* — Gordon G Liu
(74) *Attorney, Agent, or Firm* — Keller Preece PLLC

(57) ABSTRACT

This disclosure describes methods, non-transitory computer readable storage media, and systems that utilize a contrastive perceptual loss to modify neural networks for generating synthetic digital content items. For example, the disclosed systems generate a synthetic digital content item based on a guide input to a generative neural network. The disclosed systems utilize an encoder neural network to generate encoded representations of the synthetic digital content item and a corresponding ground-truth digital content item. Additionally, the disclosed systems sample patches from the encoded representations of the encoded digital content items and then determine a contrastive loss based on the perceptual distances between the patches in the encoded representations. Furthermore, the disclosed systems jointly update the parameters of the generative neural network and the encoder neural network utilizing the contrastive loss.

20 Claims, 8 Drawing Sheets

(56) References Cited

OTHER PUBLICATIONS

A. Dosovitskiy and T. Brox. Inverting visual representations with convolutional networks. In Proceedings of the IEEE conference on computer vision and pattern recognition, pp. 4829-4837, 2016.

I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pp. 2672-2680, 2014.

P. Isola, J.-Y. Zhu, T. Zhou, and A. A. Efros. Image-to-image translation with conditional adversarial networks. In Proceedings of IEEE Conference on Computer Vision and Pattern Recognition (CVPR), 2017.

J. Johnson, A. Alahi, and L. Fei-Fei. Perceptual losses for real-time style transfer and super-resolution. In European conference on computer vision, pp. 694-711. Springer, 2016.

T. Park, M.-Y. Liu, T.-C. Wang, and J.-Y. Zhu. Semantic image synthesis with spatially-adaptive normalization. In Proceedings of IEEE Conference on Com-puter Vision and Pattern Recognition (CVPR), 2019.

K. Simonyan and A. Zisserman. Very deep convolutional networks for large-scale image Yecognition. arXiv preprint arXiv:1409.1556, 2014.

A.van den Oord, Y. Li, and O.Vinyals. Representation Learning with Contrastive Predictive Coding. arXiv e-prints, p. arXiv:1807.03748, Jul. 2018.

Z. Wang, A. C. Bovik, H. R. Sheikh, and E. P. Simoncelli. Image quality assessment: from error visibility to structural similarity. IEEE transactions on image processing, 13(4):600-612, 2004.

L. Zhang, L. Zhang, X. Mou, and D. Zhang. Fsim: A feature similarity index for image quality assessment. IEEE transactions on Image Processing, 20(8):2378-2386, 2011.

R. Zhang, P. Isola, A. A. Efros, E. Shechtman, and O. Wang. The unreasonable effectiveness of deep features as a perceptual metric. In Proceedings of the IEEE conference on computer vision and pattern recognition, pp. 586-595, 2018.

\* cited by examiner

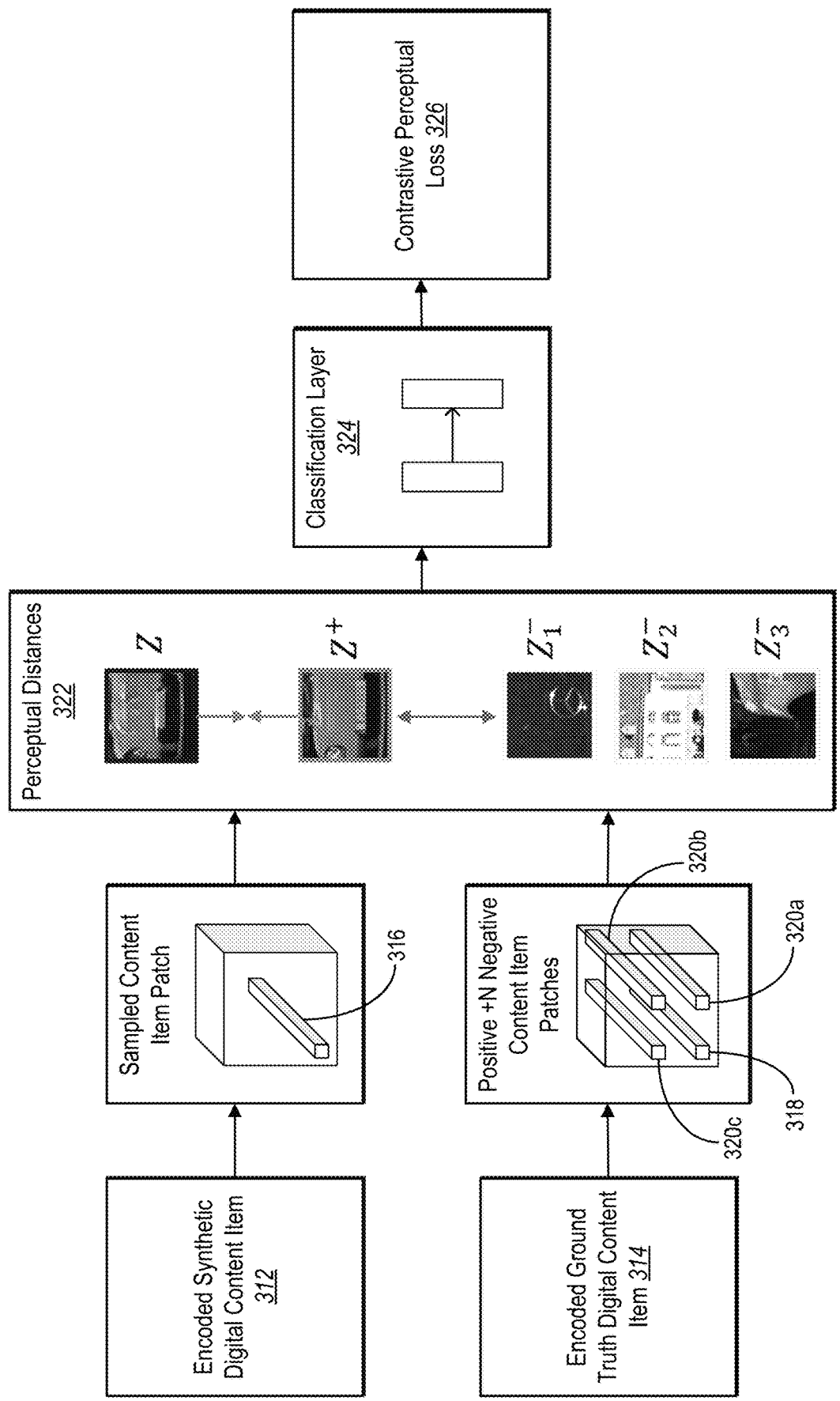

MODIFYING NEURAL NETWORKS FOR SYNTHETIC CONDITIONAL DIGITAL CONTENT GENERATION UTILIZING CONTRASTIVE PERCEPTUAL LOSS

BACKGROUND

Based on improvements to computer processing and modeling, computing systems can utilize artificial intelligence models to transform an input signal to a desired output signal. For example, many systems that utilize computer graphics, audio processing, and computer vision processing utilize machine-learning models to generate or modify digital content in a variety of ways. To illustrate, some systems utilize machine-learning processes to perform image super-resolution, image denoising, and automatically generating images from labels maps. The accuracy of digital content generation or manipulation, however, depends on the accuracies of the machine-learning models (e.g., neural network parameters) that perform the processes as well as the underlying perceptual similarity measures utilized to train the artificial intelligence to differentiate between digital signals. Accordingly, utilizing perceptual similarity measures to generate and train models to accurately produce a desired output based on a specific input or set of inputs is an important aspect of audio and image processing. Although some conventional systems exist for utilizing generative neural networks to automatically generate/modify digital content, these systems have a number of technical shortcomings, particularly with regard to flexibility, efficiency, and accuracy in training the generative neural networks to a desired output utilizing perceptual similarity operators.

SUMMARY

This disclosure describes one or more embodiments of methods, non-transitory computer readable media, and systems that solve the foregoing problems in addition to providing other benefits by utilizing a contrastive perceptual loss relative to a plurality of sampled patches of a ground truth to more accurately learn parameters of a generative neural network. In particular, the disclosed systems can utilize a contrastive perceptual loss to provide a structured, data-driven, adaptive approach to training generative neural networks utilizing a full reference ground truth. In this manner, the disclosed systems can improve the accuracy, efficiency, and flexibility of conditional generative neural networks as well as implementing computing systems in analyzing the perceptual similarity of digital signals.

To illustrate, the disclosed systems utilize a conditional generative neural network to generate a synthetic digital content item based on a guide input (e.g., a semantic label map). Additionally, the disclosed systems utilize an encoder neural network to encode the synthetic digital content item and a ground-truth digital content item corresponding to the guide input. The disclosed systems determine a contrastive loss between the encoded versions of the synthetic digital content item and the ground-truth digital content item by comparing a sample from the encoded synthetic digital content item to positive and negative samples from the encoded ground-truth digital content item. Furthermore, the disclosed systems utilize the contrastive perceptual loss to update parameters of the generative neural network and the encoder neural network. In some embodiments, the disclosed systems are implemented as part of a generative adversarial network and update parameters of the generative neural network based on both the contrastive loss and a discriminator loss from a discriminator neural network. Moreover, in some implementations the disclosed systems also utilize the updated neural networks with updated parameters to generate new synthetic digital content items. By utilizing a contrastive perceptual loss on sampled patches between a synthetic digital content item and its ground-truth digital content item, the disclosed systems can flexibly train and significantly improve the accuracy of generative neural networks.

BRIEF DESCRIPTION OF THE DRAWINGS

The detailed description refers to the drawings briefly described below.

FIGS. 3A-3C illustrate detailed diagrams of the contrastive perceptual loss system determining a contrastive loss between digital content items in accordance with one or more implementations.

DETAILED DESCRIPTION

Figure 1:
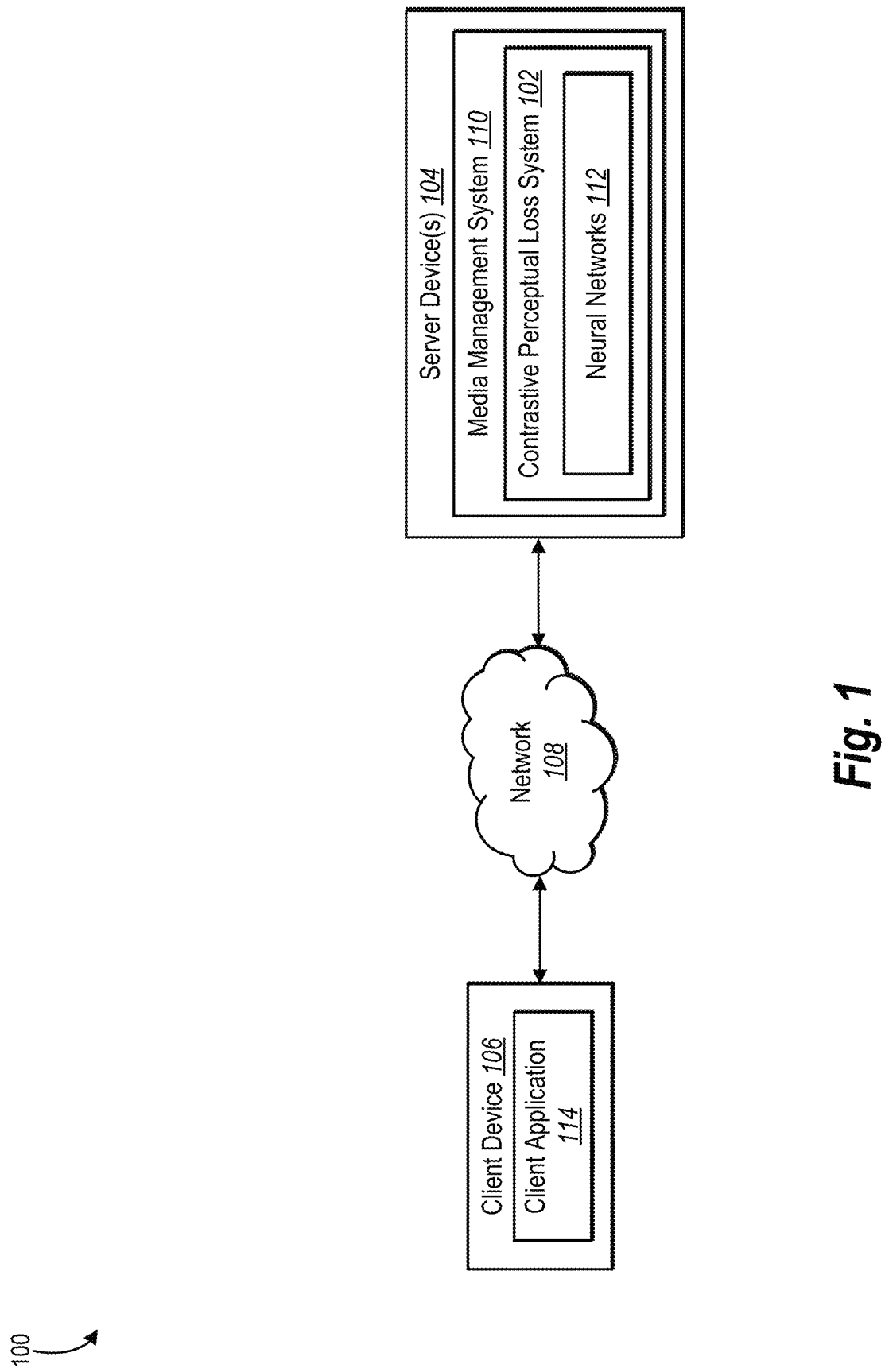
FIG. 1 illustrates a block diagram of a system environment in which a contrastive perceptual loss system is implemented in accordance with one or more implementations.

This disclosure describes one or more embodiments of a contrastive perceptual loss system that improves generative neural networks and perceptual similarity measures between digital content by utilizing a contrastive perceptual loss of input digital content items relative to sampled patches of ground-truth digital content items. In particular, in one or more embodiments, the contrastive perceptual loss system utilizes an encoder neural network to encode a synthetic digital content item generated by a generative neural network and a ground-truth digital content item. The contrastive perceptual loss system then determines a contrastive loss between the encoded synthetic digital content item and the encoded ground-truth digital content item by comparing a sampled patch from the synthetic digital content item to a positive patch and a plurality of negative patches from the ground-truth digital content item. Additionally, the contrastive perceptual loss system utilizes the contrastive loss to update parameters of the generative neural network and the encoder neural network by encouraging further similarity between the sampled patch and the positive patch while promoting further difference between the sampled patch and the negative patches. The contrastive perceptual loss system can thus improve flexibility, efficiency, and accuracy of implementing computing devices by providing a structured, data-driven, and full reference approach to measuring a perceptual similarity metric between digital content items in training and utilizing generative neural networks.

As just mentioned, in one or more embodiments the contrastive perceptual loss system utilizes a generative neural network to generate a synthetic digital content item. For example, the contrastive perceptual loss system utilizes the generative neural network to generate a synthetic digital image, video, or audio content item. In some embodiments, the generative neural network generates the synthetic digital content item based on a guide input (e.g., a semantic label map) corresponding to a ground-truth digital content item. In some implementations, the contrastive perceptual loss system attempts to recreate the ground-truth digital content item via the generative neural network by utilizing the guide input.

Additionally, in one or more embodiments, the contrastive perceptual loss system encodes the digital content items by utilizing an encoder neural network. Specifically, the contrastive perceptual loss system utilizes the encoder neural network to generate an encoded synthetic digital content item and an encoded ground-truth digital content item. For example, the encoder neural network includes a feature extraction layer and a projection layer to determine feature representations of the digital content items and then project the feature representations to a lower dimension space. The contrastive perceptual loss system thus determines the encoded synthetic digital content item and the encoded ground-truth digital content item from the feature representations in the lower dimension space.

In one or more embodiments, the contrastive perceptual loss system compares the encoded digital content items to determine a contrastive loss. For example, the contrastive perceptual loss system samples a synthetic patch at a location within the encoded synthetic digital content item. The contrastive perceptual loss system also samples a positive patch from the encoded ground-truth digital content item at a location corresponding to the location of the synthetic patch. Additionally, the contrastive perceptual loss system also samples a plurality of negative patches from the encoded ground-truth digital content item at a plurality of additional locations not corresponding to the location of the synthetic patch. The contrastive perceptual loss system determines the contrastive loss by comparing the synthetic patch from the encoded synthetic digital content item to the positive and negative patches from the encoded ground-truth digital content item. In one or more embodiments, the contrastive perceptual loss system also determines a multi-layer contrastive loss based on a plurality of contrastive losses corresponding to a plurality of iterative feature representations and corresponding patch comparisons.

After determining the contrastive loss based on the sampled patches in the encoded digital content items, in one or more embodiments the contrastive perceptual loss system updates one or more neural networks. For example, the contrastive perceptual loss system utilizes the contrastive loss to jointly train the generative neural network and the encoder neural network. To illustrate, the contrastive perceptual loss system learns/updates parameters of the generative neural network and the encoder neural network via backpropagation of the contrastive loss. Accordingly, the contrastive perceptual loss system increases the lower bound of the mutual information between the synthetic and ground-truth digital content items by encouraging the encoded representations of corresponding patches in the synthetic and ground-truth digital content items to be close (e.g., similar) for positive samples and far (e.g., dissimilar) for negative samples.

In one or more embodiments, the contrastive perceptual loss system also operates as part of a generative adversarial network that includes both a generative neural network and a discriminator neural network to judge whether a conditionally generated output of the generative neural network is real or fake. To illustrate, the contrastive perceptual loss system trains the generative neural network utilizing both a discriminator loss (e.g., utilizing a discriminator neural network) in conjunction with the contrastive loss to update parameters of the generative neural network. For example, the contrastive perceptual loss system applies the discriminator neural network to a synthetic digital item generated by the generative neural network and determines a discriminator loss based on the output of the discriminator neural network. In some implementations, the contrastive perceptual loss modifies parameters of the generative neural network utilizing this discriminator loss in addition to the contrastive perceptual loss resulting from processing the synthetic digital content item utilizing the encoder neural network. In one or more additional embodiments, the contrastive perceptual loss system determines an $L_1$ or an $L_2$ loss based on the output of the generative neural network for further training the generative neural network.

As mentioned above, conventional digital content generation systems suffer from a number of technical shortcomings with regard to implementing computing devices. For example, existing digital content generation systems lack accuracy due to improperly training machine-learning models to accurately recognize differences between digital content items. Specifically, some existing systems determine unstructured differences between digital images by determining a Euclidean distance (e.g., $L_2$ distance) between the digital images. Specifically, these existing systems iterate through each pixel separately to compare a distance to determine the averaged distance across all pixels. While these existing systems provide a measure of difference based on pixel values, the systems fail to accurately determine difference between digital images that may have similar pixel values but significant perceptual differences due to being unstructured and sensitive to noise.

Additionally, some existing systems utilize neural networks to determine perceptual losses by calculating distances in the feature space, rather than between pixels. Typically, these systems provide greater accuracy for perceptual differences than per-pixel differences. These existing systems, however, lack accuracy, flexibility, and efficiency when applying the neural networks to new data. In particular, these systems are pre-trained on a specific dataset with "frozen" (e.g., pre-set) parameters, which results in the systems being ill-suited for adapting to the data at hand. Additionally, modifying these systems (e.g., by fine-tuning parameters) requires significant effort and processing resources with additional annotations.

Furthermore, some existing systems utilize adversarial frameworks to enforce a target appearance/result of an output of a generative neural network. While such systems provide good results for certain types of digital content items, these systems lack accuracy by ignoring a reference (e.g., a ground-truth) instance. Accordingly, adversarial systems are ineffective when computing distances (e.g., value differences or perceptual differences) between two instances of a digital content item.

The disclosed contrastive perceptual loss system demonstrates a number of technical improvements over existing systems. To illustrate, conventional systems lack accuracy when comparing digital content items due to providing processes that are: 1) unstructured, 2) not data-driven (e.g., dependent on the data being processed), 3) not adaptable to new domains, and/or 4) ineffective at processing reference content (e.g., ground-truth digital content items). In contrast, the contrastive perceptual loss system improves the accuracy of systems that perform digital content generation and modification such as image processing. For example, by directly comparing an output of a generative neural network (e.g., a synthetic digital content item) to a reference (e.g., a ground-truth digital content item), the contrastive perceptual loss system determines a contrastive perceptual loss that encourages the generative neural network to generate more accurate outputs.

Furthermore, the contrastive perceptual loss system improves the efficiency and flexibility of digital content generation/modification systems. Specifically, by continually learning parameters of a generative neural network and an encoder neural network based on a contrastive loss between a synthetic digital content item and its ground-truth, the contrastive perceptual loss system trains the neural networks on digital content items being processed. Thus, the contrastive perceptual loss system adapts the neural networks to the domain(s) of the digital content items being processed while also generating accurate outputs for the processed digital content items, which is particularly useful with high-dimensional digital content items. The contrastive perceptual loss system is also adaptive across a plurality of modalities including digital image content, digital video content, or digital audio content.

In sum, the contrastive perceptual loss system can learn a deep perceptual embedding on ground truth and generated digital content items/signals. Accordingly, the contrastive perceptual loss provides an intelligent approach to learning to measure the perceptual similarity between two digital content items. This improved measure of perceptual similarity can be utilized in training a variety of generative/synthesis models, including models for superresolution, denoising, and video future-frame synthesis. Moreover, the contrastive perceptual loss system need not rely on a pretrained neural network, adapts to the training data, and allows for comparing two digital content items directly.

As illustrated by the foregoing discussion, the present disclosure utilizes a variety of terms to describe features and advantages of the coordinate alignment system. Additional detail is now provided regarding the meaning of such terms. For example, as used herein, the term "digital content item" refers to a computer representation of an image, a video, or audio. In one or more embodiments, a digital content item includes an image file, a video file including a plurality of individual image frames, or an audio file.

Furthermore, as used herein, the term "synthetic digital content item" refers to a digital content item generated by a neural network. For example, a synthetic digital content item includes a digital image generated by a neural network based on an input. To illustrate, a synthetic digital content item includes a newly generated digital content item or a modified digital content item based on parameters of a generative neural network. Additionally, as used herein, the term "ground-truth digital content item" refers to a digital content item that provides a reference for comparing to a synthetic digital content item. In one or more embodiments, a ground-truth digital content item includes a digital image used to create an input to a neural network that outputs a synthetic digital image. In one or more additional embodiments, a ground-truth digital content item includes a perceptually plausible digital content item in a set of perceptually plausible output digital content items.

As used herein, the terms "encoded digital content item," "encoded synthetic digital content item," and "encoded ground-truth digital content item" refer to an encoded representation of a digital content item (i.e., a synthetic digital content item or a ground-truth digital content item). In one or more embodiments, an encoded digital content item includes a feature representation of a digital content item that is generated by an encoder neural network. In one or more additional embodiments, an encoded digital content item includes a feature representation in a different dimension space than a corresponding digital content item (e.g., in a lower dimension space).

Furthermore, as used herein, the term "feature representation" refers to a set of features extracted from a digital content item. For instance, a feature representation includes a feature vector or a feature matrix. Additionally, a feature representation can include an intermediate feature representation prior to a final feature representation of a digital content item.

As used herein, the term "guide input" refers to a neural network input for directing the generation of a synthetic digital content item. For instance, a guide input includes a semantic label map indicating labeled portions of a ground-truth digital content item for inputting to a generative neural network to generate a digital image. A guide input can also include other types of input, such as a low-resolution digital image, or a noisy/cluttered digital image. In one or more alternative embodiments, a guide input includes an input to a generative neural network for generating a digital audio track (e.g., a noisy audio track for audio denoising).

As used herein, the terms "patch" and "sampled patch" refer to an identified portion of an encoded representation of a digital content item. For example, a patch includes a specific spatial region of a digital image (e.g., a selected set of pixels as represented in an encoded digital content item). Alternatively, a patch includes a specific time range of audio samples in a digital audio track or a specific set of frames in a digital video. Furthermore, as used herein, the term "synthetic patch" refers to a patch in an encoded representation of a synthetic digital content item. Additionally, as used herein, the term "positive patch" refers to a patch in an encoded representation of a ground-truth digital content item sampled at a location corresponding to (e.g., matching) a location of a synthetic patch in an encoded representation of a synthetic digital content item. As used herein, the term "negative patch" refers to a patch in an encoded representation of a ground-truth digital content item sampled at a location that does not correspond to (e.g., does not match) a location of a synthetic patch in an encoded representation of a synthetic digital content item.

As used herein, the term "neural network" includes a computer representation that is tuned (e.g., trained) based on inputs to approximate unknown functions. In particular, a neural network includes one or more layers (i.e., artificial neurons) that utilize algorithms to learn from, and make predictions on, known data by analyzing the known data to learn to generate outputs that reflect patterns and attributes of the known data. These internal layers include a variety of tunable weights (referred to as parameters) that can be modified (e.g., to learn to approximate complex functions). For example, a neural network makes high-level abstractions in data by generating data-driven predictions or decisions from the known input data. In some embodiments, a neural network includes, but is not limited to, a convolutional neural network, a recurrent neural network, or an adversarial neural network.

For instance, as used herein, the term "generative neural network" refers to a neural network that automatically generates a digital content item based on a guide input. In one or more embodiments, a generative neural network includes a conditional generative neural network for conditional generation of digital content (e.g., generating digital content based on a conditional input guiding the neural network to a desired result). In one or more embodiments, a generative neural network includes a deconvolution neural network. Additionally, as used herein, the term "encoder neural network" refers to a neural network that encodes a digital content item by generating a feature representation based on identified features of the digital content item. In one or more embodiments, an encoder neural network includes a feature extraction layer to extract features from a digital content item and a projection layer to project a feature representation to a different dimension space. As used herein, the term "discriminator neural network" refers to a neural network that evaluates an output of a generative neural network to determine a loss associated with the output. In particular, a discriminator neural network can analyze a digital content item and predict whether the output was generated by a generative neural network (e.g., whether the digital content item is a synthetic digital content item) or not (e.g., whether the digital content item is a ground truth digital content item). This authenticity prediction can then be utilized to determine a discriminator loss (e.g., a measure of loss reflecting the accuracy of the authenticity prediction).

As used herein, the terms "contrastive loss" and "contrastive perceptual loss" refer to a loss difference between a synthetic digital content item and a ground-truth digital content item. For example, a contrastive loss includes a loss based on a comparison of a patch in a first digital content item (e.g., a synthetic digital content item) to a positive patch and a plurality of negative patches in a second digital content item (e.g., a ground-truth digital content item). In one or more embodiments, the contrastive perceptual loss system utilizes a contrastive loss to update, or otherwise modify, parameters of one or more neural networks for generating synthetic digital content items.

As used herein, the term "perceptual distance" refers to a value indicating a measurement of a difference between two encoded digital content items according to human perception. For example, a perceptual distance includes a measured value of a visual difference between a portion of a synthetic digital image and a portion of a ground-truth digital image according to human visual perception. In some embodiments, perceptual distance is measured by the distance between feature vectors in a perceptual feature space, as described in greater detail below.

Turning now to the figures, FIG. 1 illustrates a schematic diagram of a system environment 100 in which a contrastive perceptual loss system 102 can operate. In particular, the system environment 100 includes server device(s) 104 and a client device 106 in communication via a network 108. Moreover, as shown, the server device(s) 104 include a media management system 110, which includes the contrastive perceptual loss system 102. Furthermore, the contrastive perceptual loss system 102 includes neural networks 112. Additionally, the client device 106 includes a client application 114.

As shown in FIG. 1, the server device(s) 104 includes or hosts the media management system 110. In one or more embodiments, the media management system 110 includes, or is part of, one or more systems that implement the management of digital content items for storing, creating, modifying, or displaying digital content items for one or more users of the media management system. For example, the media management system 110 provides tools for viewing, generating, editing, or otherwise interacting with digital content items. To illustrate, the media management system 110 provides tools for creating or editing digital images, digital video, digital audio, or other media to the client device 106 via the client application 114. In some embodiments, the media management system 110 provides a remote graphical user interface to the client device 106 for a user to interact with digital content items via the client application 114 on the client device 106.

Furthermore, in one or more embodiments, the media management system 102 provides tools for generating or modifying digital content items by utilizing machine-learning. For example, FIG. 1 illustrates that the media management system 110 includes the contrastive perceptual loss system 102. Specifically, the contrastive perceptual loss system 102 includes one or more neural networks (e.g., neural networks 112) for generating digital content in response to a request to generate digital content (e.g., from the client device 106).

For example, the contrastive perceptual loss system 102 can train a generative neural network to generate synthetic digital content items including, but not limited to, synthetic digital images or synthetic digital audio. In one or more embodiments, the contrastive perceptual loss system 102 trains and/or utilizes the generative neural network to generate synthetic digital content items based on ground-truth digital content items (e.g., via a guide input associated with the ground-truth digital content item).

In one or more additional embodiments, the neural networks 112 also include one or more neural networks for determining a contrastive loss associated with generated digital content items. For example, in one or more embodiments, the contrastive perceptual loss system 102 utilizes an encoder neural network to generate encoded representations of a synthetic digital content item and a ground-truth digital content item. The contrastive perceptual loss system 102 then determines a contrastive loss from the encoded representations by comparing patches across the encoded representations. The contrastive perceptual loss system 102 also updates parameters of the neural networks 112 to improve accuracy of the neural networks 112 based on the contrastive loss.

Upon modifying these parameters, the contrastive perceptual loss system 102 can further utilize the neural networks 112 to generate digital content items. Indeed, the contrastive perceptual loss system 102 can analyze a guide input (e.g., the same guide input or a new guide input with a new ground truth) from the client device 106 and generate a digital content item from the guide input. After generating digital content utilizing the contrastive perceptual loss system 102, the media management system 110 provides the generated digital content to the client device 106. For example, the media management system 110 sends digital content to the client device 106 for display within the client application 114. In some embodiments, the media management system 110 receives a plurality of requests from the client device 106 to generate or modify a digital content item in a plurality of sequential operations. Accordingly, the media management system 110 can provide the resulting digital content item after each operation to the client device 106 to provide updates or previews to a user of the client device 106.

In addition, as shown in FIG. 1, the system environment 100 includes the client device 106. The client device 106 can include, but is not limited to, a mobile device (e.g., smartphone or tablet), a laptop, a desktop, including those explained below with reference to FIG. 6. Furthermore, although not shown in FIG. 1, the client device 106 can be operated by a user (e.g., a user included in, or associated with, the system environment 100) to perform a variety of functions. In particular, in one or more embodiments, the client device 106 performs functions, such as, but not limited to, accessing, viewing, and interacting with a variety of digital content (e.g., via the client application 114). Additionally, the client device 106 also performs functions for generating, capturing, or accessing data to provide to the media management system 110 via the network 108. In one or more embodiments, the contrastive perceptual loss system 102 analyzes input guides and/or ground truth digital images obtained from the client device 106 to generate synthetic digital content. For example, the contrastive perceptual loss system 102 can receive an input guide to denoise an existing digital image (e.g., generate an improved, synthetic digital image without the noise or visual clutter of an existing digital image). Similarly, the contrastive perceptual loss system 102 can receive a low-resolution digital image and generate a high-resolution digital image. Moreover, the contrastive perceptual loss system 102 can generate a new digital image given pixel labels for different object classes. Although FIG. 1 illustrates the system environment 100 with a single client device 106, the system environment 100 alternatively includes a different number of client devices.

In one or more embodiments, the server device(s) 104 include a variety of computing devices, including those described below with reference to FIG. 6. For example, the server device(s) 104 includes one or more servers for storing and processing data associated with digital content items (e.g., images, video, or audio). The server device(s) 104 can also include a plurality of computing devices in communication with each other, such as in a distributed storage environment. In some embodiments, the server device(s) 104 comprise a content server. In one or more embodiments, the server device(s) 104 can comprise an application server, a communication server, a web-hosting server, a social networking server, a digital content campaign server, or a digital communication management server.

Additionally, as shown in FIG. 1, the system environment 100 includes the network 108. The network 108 enables communication between components of the system environment 100. In one or more embodiments, the network 108 includes the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 may communicate via the network using a variety of communication platforms and technologies suitable for transporting data and/or communication signals, including any known communication technologies, devices, media, and protocols supportive of data communications, examples of which are described with reference to FIG. 6.

Although FIG. 1 illustrates the server device(s) 104 and the client device 106 communicating via the network 108, the various components of the system environment 100 alternatively communicate and/or interact via other methods (e.g., the server device(s) 104 and the client device 106 communicate directly). Furthermore, although FIG. 1 illustrates the contrastive perceptual loss system 102 being implemented by a particular component and/or device within the system environment 100, the contrastive perceptual loss system 102 can be implemented, in whole or in part, by other computing devices and/or components in the system environment 100 (e.g., via the client device 106).

Figure 2:
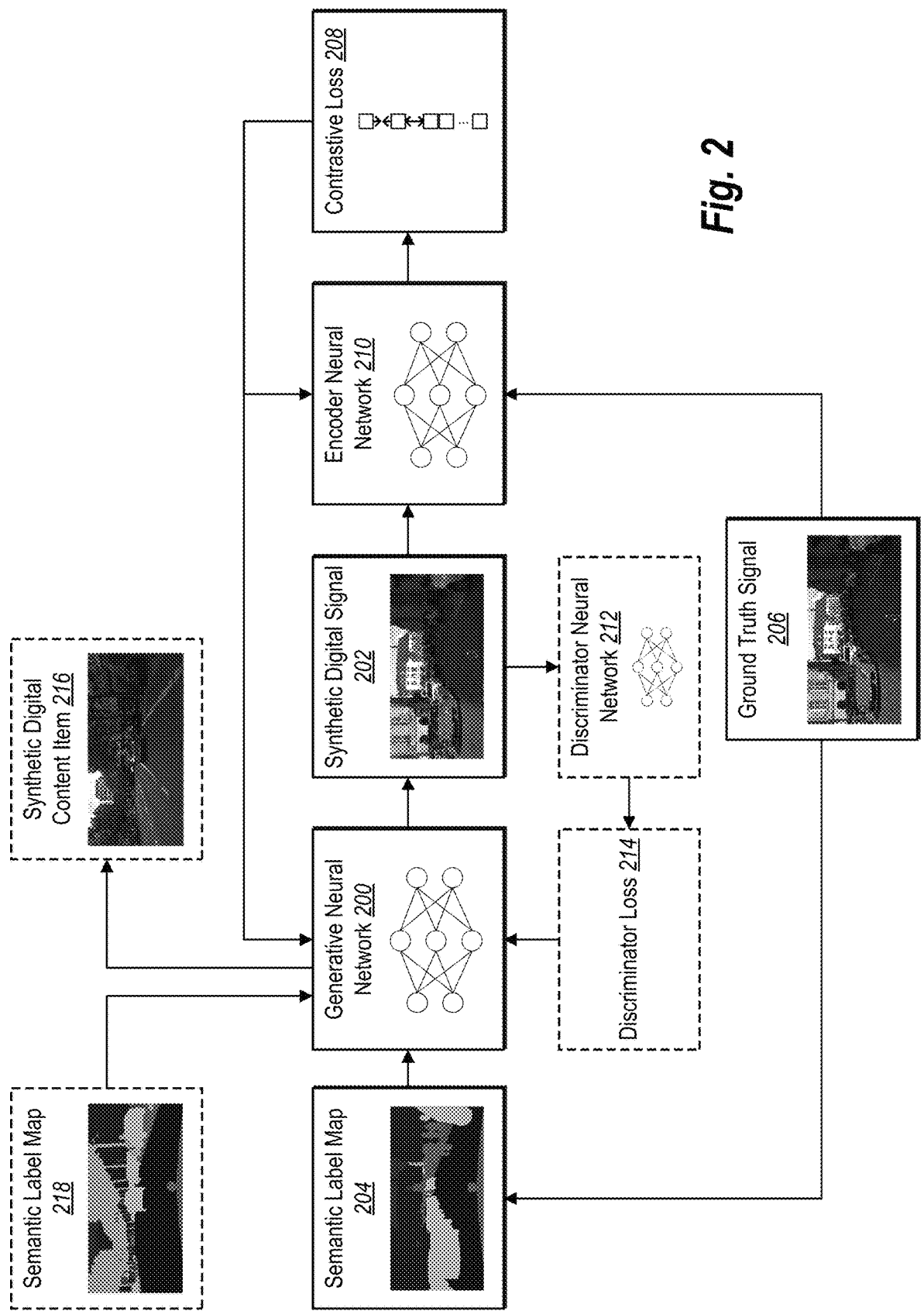
FIG. 2 illustrates an overview diagram of the contrastive perceptual loss system determining a contrastive loss between digital content items for a generative neural network in accordance with one or more implementations.

As mentioned above, the contrastive perceptual loss system 102 accurately and flexibly generates synthetic digital content items and updates neural networks for generating synthetic digital content items by utilizing a contrastive perceptual loss with reference to ground-truth digital content items. FIG. 2 illustrates an example of the contrastive perceptual loss system 102 determining a contrastive loss in accordance with one or more embodiments. Specifically, the contrastive perceptual loss system 102 generates synthetic digital content in connection with a ground-truth reference. The contrastive perceptual loss system 102 then determines the contrastive loss according to a patchwise comparison between the synthetic digital content and the ground-truth reference.

In one or more embodiments, the contrastive perceptual loss system 102 includes a generative neural network 200 to generate a synthetic digital content item 202. For example, the generative neural network 200 receives a guide input to use as a basis for generating the synthetic digital content item 202. To illustrate, the contrastive perceptual loss system 102 provides, as an input to the generative neural network 200, a semantic label map 204 corresponding to a ground-truth digital content item 206. In at least some embodiments, the semantic label map 204 includes an image segmentation that includes labels to indicate a class of what is being represented at each pixel or region of the ground-truth digital content item 206. Accordingly, as illustrated in FIG. 2, the semantic label map 204 includes a plurality of regions with a plurality of labels indicating different objects or classes of objects in the ground-truth digital content item 206.

Additionally, as mentioned, the contrastive perceptual loss system 102 utilizes the generative neural network 200 to generate the synthetic digital content item 202 based on the semantic label map 204. Specifically, the generative neural network 200 intelligently generates the synthetic digital content item 202 to reconstruct the ground-truth digital content item 206 according to the label(s) in the semantic label map 204. For example, the generative neural network 200 determines a class for each pixel/region based on the semantic label map 204 and then generates representations for the corresponding classes in the synthetic digital content item 202.

In at least some embodiments, the generative neural network 200 is a pre-trained neural network that the contrastive perceptual loss system 102 continually trains based on one or more losses. For example, as illustrated in FIG. 2, the contrastive perceptual loss system 102 determines a contrastive loss 208 based on the synthetic digital content item 202 and the ground-truth digital content item 206. In particular, the contrastive perceptual loss system 102 utilizes an encoder neural network 210 to encode the synthetic digital content item 202 and the ground-truth digital content item 206. For instance, the contrastive perceptual loss system 102 utilizes the encoder neural network 210 to generate a feature representation of each digital content item and then project the feature representations to a lower dimension space.

In addition, FIG. 2 illustrates that the contrastive perceptual loss system 102 determines the contrastive loss 208 from the output of the encoder neural network 210. Specifically, the contrastive perceptual loss system 102 performs a patchwise comparison between the encoded representations of the synthetic digital content item 202 and the ground-truth digital content item 206. For example, the contrastive perceptual loss system 102 samples patches from the encoded representations of the digital content items. The contrastive perceptual loss system 102 then determines the contrastive loss 208 by comparing positive and negative sampled patches (e.g., based on the locations of the patches within the encoded representations).

In one or more embodiments, after determining the contrastive loss 208, the contrastive perceptual loss system 102 utilizes the contrastive loss 208 to update parameters of the neural networks. For instance, the contrastive perceptual loss system 102 backpropagates the contrastive loss 208 to the generative neural network 200 and the encoder neural network 210 to jointly modify parameters of each neural network. In particular, in one or more embodiments, the contrastive perceptual loss system 102 utilizes the contrastive loss 208 to train the neural networks to maximize the lower bound of the mutual information between the synthetic digital content item 202 and the ground-truth digital content item 206. For example, the contrastive perceptual loss system 102 increases the mutual information by encouraging more similar associations between positive samples in outputs of the neural networks and less similar associations (e.g., greater differences) between positive samples in the outputs of the neural networks.

In at least some embodiments, the contrastive perceptual loss system 102 utilizes the generative neural network 200 in connection with a discriminator neural network 212. To illustrate, the contrastive perceptual loss system 102 can utilize the generative neural network 200 in a generative adversarial network ("GAN") that utilizes the discriminator neural network 212 to determine a discriminator loss 214. In particular, the generative neural network 200 attempts to "fool" the discriminator neural network 212, such that the contrastive perceptual loss system 102 determines the discriminator loss 214 based on how successfully the generative neural network 200 fools the discriminator neural network 212. For example, the discriminator neural network 212 makes an authenticity prediction as to whether the synthetic digital signal 202 is authentic (e.g., a ground-truth digital image or a synthetic digital image). The contrastive perceptual loss system 102 then determines the discriminator loss 214 based on whether the authenticity prediction is accurate (e.g., whether the analyzed digital image was synthetic or not). Moreover, the contrastive perceptual loss system 102 utilizes the discriminator loss 214 to update parameters of the generative neural network 200 in addition to updating the parameters of the generative neural network 200 based on the contrastive loss 208.

In one or more additional embodiments, the contrastive perceptual loss system 102 utilizes the generative neural network 200 with updated parameters based on the contrastive loss 208 to generate an additional synthetic digital content item 216. For instance, the contrastive perceptual loss system 102 utilizes the generative neural network 200 to generate the additional synthetic digital content item 216 based on an additional semantic label map 218. In particular, the additional semantic label map 218 can correspond to an additional ground-truth digital content item. In alternative embodiments, the contrastive perceptual loss system 102 utilizes the generative neural network 200 to generate a new synthetic digital content item based on the semantic label map 204 to provide an improved synthetic digital content item.

Figure 3A:
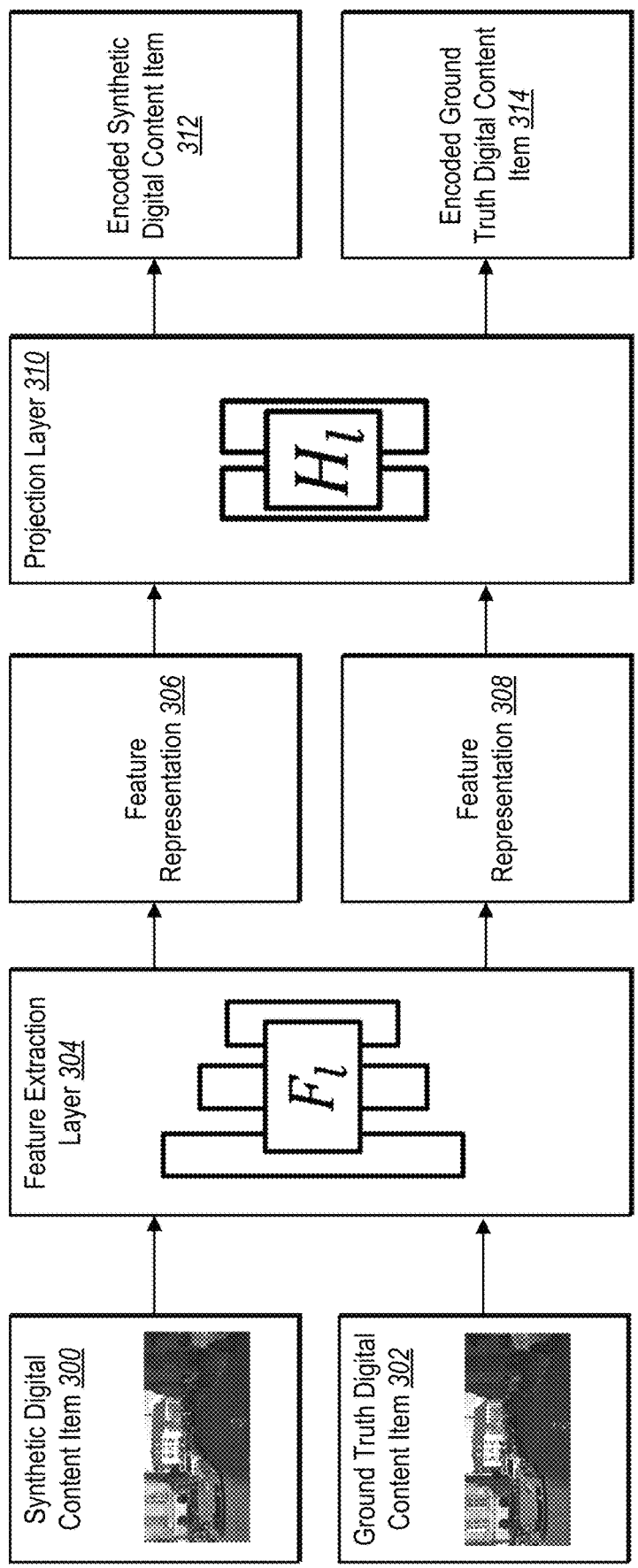
Figure 3C:
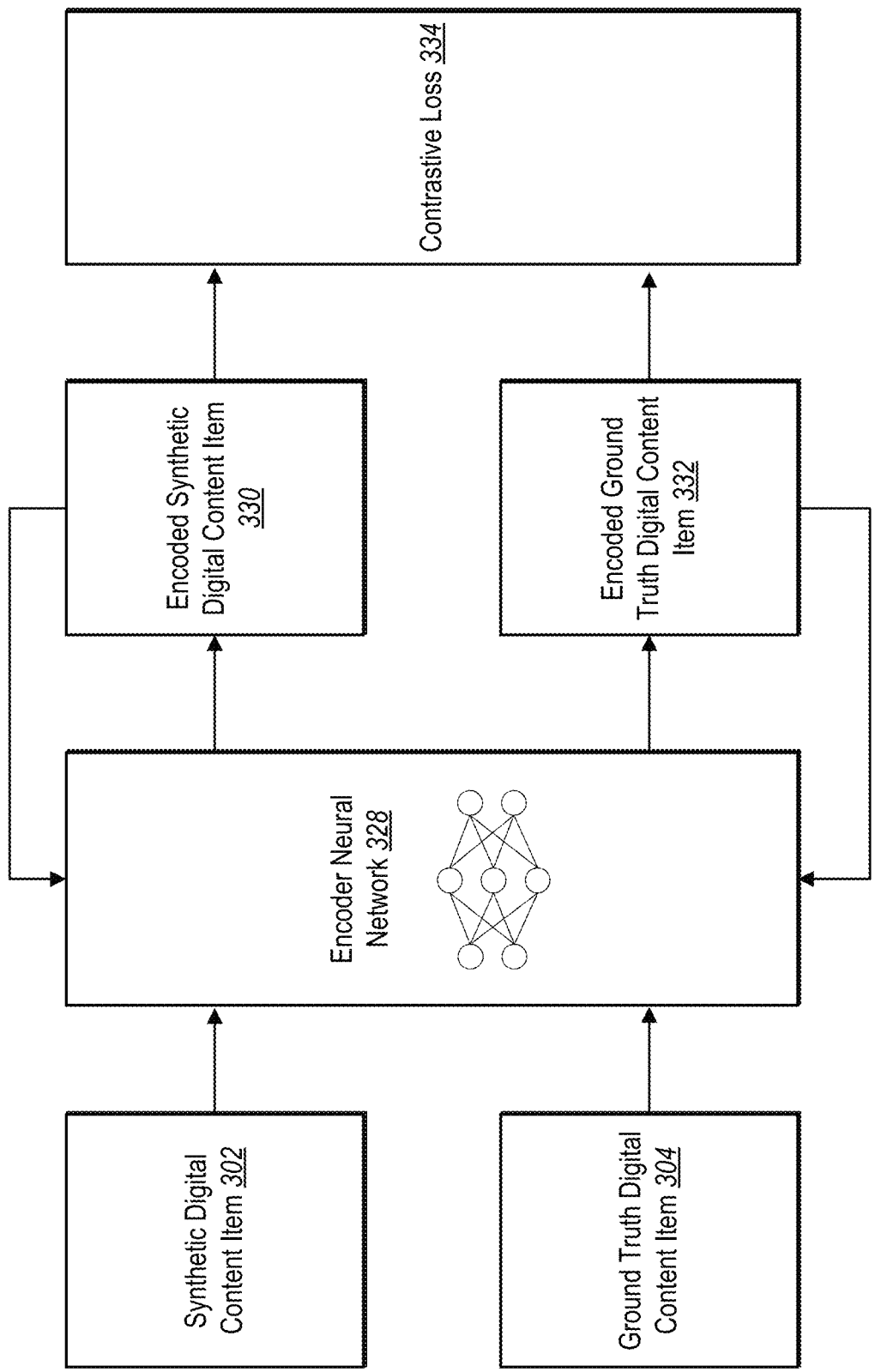

As previously mentioned, in some implementations the contrastive perceptual loss system 102 determines a contrastive loss based on encoded representations of a synthetic digital content item and its corresponding ground-truth digital content item. FIGS. 3A-3B illustrate a detailed process associated with determining a contrastive loss in accordance with one or more embodiments. FIG. 3C illustrates the contrastive perceptual loss system 102 determining a multilayer patchwise contrastive loss (in a plurality of iterations) in accordance with one or more embodiments.

FIG. 3A illustrates that the contrastive perceptual loss system 102 first receives a synthetic digital content item 300 and a corresponding ground-truth digital content item 302 as inputs to an encoder neural network. For example, as previously noted with regard to FIG. 2, the contrastive perceptual loss system 102 generates the synthetic digital content item 300 from a semantic label map or other guide input corresponding to the ground-truth digital content item 302. In one or more embodiments, the semantic label map is generated from the ground-truth digital content item 302. In alternative embodiments, the ground-truth digital content item 302 is a desired perceptually plausible output of the generative neural network based on the semantic label map. Accordingly, the ground-truth digital content item provides a reference for the contrastive perceptual loss system 102 to determine a contrastive loss associated with the synthetic digital content item 300.

In one or more embodiments, an encoder neural network includes a feature extraction layer 304 to extract a plurality of features from the synthetic digital content item 300 and the ground-truth digital content item 302. For instance, the feature extraction layer 304 includes a convolutional layer to process each digital content item and extract a set of features for each digital content item. To illustrate, for a synthetic digital image and a corresponding ground-truth digital image, the feature extraction layer 304 encodes the digital images by extracting visual features from the digital images.

More specifically, the feature extraction layer 304 generates a first feature representation 306 for the synthetic digital content item. For example, the feature extraction layer 304 extracts a first set of feature tensors from the synthetic digital content item 300. Additionally, the feature extraction layer 304 generates a second feature representation 308 for the ground-truth digital content item. For instance, the feature extraction layer 304 extracts a second set of feature tensors from the ground-truth digital content item. In one or more embodiments, the feature extraction layer 304 extracts additional information associated with the features such as spatial locations corresponding to the features.

Furthermore, as illustrated in FIG. 3A, the encoding neural network of the contrastive perceptual loss system 102 includes a projection layer 310. In one or more embodiments, the projection layer 310 receives the first feature representation 306 associated with the synthetic digital content item 300 and the second feature representation 308 associated with the ground-truth digital content item 302. For example, the projection layer 310 includes a multilayer perceptron that projects the first feature representation 306 and the second feature representation to a different space (e.g., a lower dimension space). In one or more embodiments, the contrastive perceptual loss system 102 determines an encoded synthetic digital content item 312 and an encoded ground-truth digital content item 314 from the corresponding feature representations. More specifically, in one or more embodiments, the encoded synthetic digital content item 312 and the encoded ground-truth digital content item 314 include extracted sets of feature tensors projected into a lower dimension space.

FIG. 3B illustrates that the contrastive perceptual loss system 102 compares the encoded digital content items utilizing a patchwise contrastive loss process. Specifically, in one or more embodiments, the contrastive perceptual loss system 102 samples a synthetic patch 316 from the encoded synthetic digital content item 312. For example, the contrastive perceptual loss system 102 samples the synthetic patch 316 by selecting (e.g., randomly) a location within the synthetic digital content item 300. To illustrate, the contrastive perceptual loss system 102 samples a patch by selecting a spatial location defined by a plurality of pixels within a synthetic digital image. The contrastive perceptual loss system 102 then determines a corresponding location for the sampled patch in the encoded synthetic digital content item 312.

FIG. 3B also illustrates that the contrastive perceptual loss system 102 samples a plurality of patches from the encoded ground-truth digital content item 314. For instance, the contrastive perceptual loss system 102 samples a positive patch 318 from the encoded ground-truth digital content item 314 by determining a location (e.g., a spatial location) within the ground-truth digital content item 302 that corresponds to (e.g., matches or aligns with) the location of the synthetic patch 316. Specifically, the positive patch 318 and the synthetic patch 316 have the same relative location in the ground-truth digital content item 302 and the synthetic digital content item 300, respectively (e.g., the positive patch 318 and the synthetic patch 316 have the same (x, y) coordinates). Furthermore, the positive patch 318 and the synthetic patch 316 are at the same relative locations within the encoded ground-truth digital content item 314 and the encoded synthetic digital content item 312, respectively.

In addition to sampling a positive patch 318 in the encoded ground-truth digital content item 314, the contrastive perceptual loss system 102 samples a plurality of negative patches 320a-320c in the encoded ground-truth digital content item 314. Specifically, the contrastive perceptual loss system 102 samples a plurality of patches by determining a plurality of locations within the ground-truth digital content item 302. More specifically, the determined locations for negative patches do not correspond to (e.g., do not match or align with) the location of the synthetic patch 316 from the synthetic digital content item 300. The contrastive perceptual loss system 102 then samples the negative patches 320a-320c in the encoded ground-truth digital content item 314 at a plurality of locations that are different than the location of the positive patch 318. The contrastive perceptual loss system 102 can sample any number of negative patches (e.g., N number of negative patches), depending on the desired accuracy and/or available resources.

In one or more embodiments, after sampling patches from the encoded synthetic digital content item 312 and the encoded ground-truth digital content item 314, the contrastive perceptual loss system 102 determines perceptual distances 322 between the sampled patches. In at least some embodiments, the contrastive perceptual loss system 102 utilizes a distance metric that measures a distance between the (encoded) sampled patches in the lower dimension space. To illustrate, in one or more embodiments, the contrastive perceptual loss system 102 determines a Euclidean distance (e.g., a normalized $L_2$ distance) metric to determine the perceptual distances 322. Accordingly, the contrastive perceptual loss system 102 determines the distance between each feature vector (e.g., feature representation of each pixel) of the compared patches. In one or more alternative embodiments, the contrastive perceptual loss system 102 utilizes a different perceptual similarity metric such as a structural similarity index measure to compare two sampled patches.

In one or more additional embodiments, the contrastive perceptual loss system 102 first compares the synthetic patch 316 (shown as "Z" in FIG. 3B) to the positive patch 318 ("$Z^+$" in FIG. 3B) to determine a first perceptual distance. Furthermore, the contrastive perceptual loss system 102 compares the synthetic patch 316 to a first negative patch 320a ("$Z_1^-$" in FIG. 3B) of the plurality of negative patches 320a-320c to determine a second perceptual distance. The contrastive perceptual loss system 102 also compares the synthetic patch 316 individually to each of the other negative patches (e.g., a second negative patch 320b and a third negative patch 320c) to determine additional perceptual distances.

After determining the perceptual distances 322, the contrastive perceptual loss system 102 utilizes a classification layer 324 to perform a classification operation based on the perceptual distances 322. In one or more embodiments, the classification layer 324 includes a multi-class classifier neural network layer. For example, the classification layer 324 includes a softmax layer with a cross-entropy loss to perform N+1 classification across the total number of perceptual distances that the contrastive perceptual loss system 102 determines based on comparisons between the synthetic patch (e.g., a query patch) and the positive and negative patches). FIG. 3B illustrates that the contrastive perceptual loss system 102 determines a contrastive perceptual loss 326 for the synthetic digital content item 202 and the ground-truth digital content item 302 according to the plurality of sampled patches and corresponding perceptual distances.

As briefly mentioned previously, in one or more embodiments, the contrastive perceptual loss system 102 also extends the process for determining a contrastive loss to a multi-layer contrastive loss. Specifically, FIG. 3C illustrates that the contrastive perceptual loss system 102 performs a plurality of iterations of determining a contrastive loss based on a plurality of encoded representations of the synthetic digital content item 300 and the ground-truth digital content item 302. For example, the contrastive perceptual loss system 102 determines a total contrastive loss based on a plurality of contrastive losses determined for the plurality of encoded representations.

As illustrated in FIG. 3C, the contrastive perceptual loss system 102 utilizes an encoder neural network 328 (e.g., including the feature extraction layer 304 and the projection layer 310) to generate a first set of encoded representations (e.g., a first set of feature representations projected into a first dimension space). For example, the contrastive perceptual loss system 102 utilizes the encoder neural network 328 to generate an encoded synthetic digital content item 330 from the synthetic digital content item 300. Additionally, the contrastive perceptual loss system 102 utilizes the encoder neural network 328 to generate an encoded ground-truth digital content item 332 from the ground-truth digital content item 302.

In connection with generating the first set of encoded representations, the contrastive perceptual loss system 102 determines a contrastive loss 334 based on the first set of encoded representations. For example, as previously described with respect to FIG. 3A, the contrastive perceptual loss system 102 determines the contrastive loss 334 based on sampling and comparing patches from the first set of encoded representations. To illustrate, the contrastive perceptual loss system 102 determines the contrastive loss 334 by comparing a query patch from the encoded synthetic digital content item 330 to a positive patch and a plurality of negative patches from the encoded ground-truth digital content item 332.

In one or more embodiments, after determining the contrastive loss 334 based on the first set of encoded representations, the contrastive perceptual loss system 102 utilizes the encoder neural network 328 to generate additional encoded representations of the synthetic digital content item 300 and the ground-truth digital content item 302. For example, the contrastive perceptual loss system 102 generates a second set of encoded representations based on the first set of encoded representations. To illustrate, the contrastive perceptual loss system 102 provides the encoded synthetic digital content item 330 and the encoded ground-truth digital content item 332 to the encoder neural network 328 to generate the second set of encoded representations.

Additionally, the contrastive perceptual loss system 102 utilizes the second set of encoded representations to update the contrastive loss 334. For instance, the contrastive perceptual loss system 102 compares sampled patches from the second set of encoded representations. To illustrate, the contrastive perceptual loss system 102 samples a synthetic patch from a second encoded synthetic digital content item and a positive patch and negative patches from a second encoded ground-truth digital content item. The contrastive perceptual loss system 102 then compares the synthetic patch and the positive/negative patches from the second set of encoded representations to generate a contrastive loss for the second set of encoded representations. The contrastive perceptual loss system 102 then combines the contrastive loss for the second set of encoded representations with the contrastive loss for the first set of encoded representations to determine an overall contrastive loss.

In one or more additional embodiments, the contrastive perceptual loss system 102 generates one or more additional encoded representations, resulting in one or more intermediate encoded representations. Furthermore, the contrastive perceptual loss system 102 determines a contrastive loss associated with each set of encoded representations. Accordingly, the contrastive perceptual loss system 102 determines a multi-layer contrastive loss involving any number of intermediate feature representations of the synthetic digital content item 300 and the ground-truth digital content item 302. In one or more embodiments, the contrastive perceptual loss system 102 determines the number of intermediate representations based on a predetermined setting (e.g., a set number of encoded representations). In one or more alternative embodiments, the contrastive perceptual loss system 102 dynamically determines the number of intermediate representations based on a threshold loss (e.g., by comparing a contrastive loss at each iteration until the contrastive loss meets the threshold loss) or available computing resources.

As described above, the contrastive perceptual loss system 102 determines a contrastive loss in connection with a generative neural network by utilizing an encoder neural network. In one or more embodiments, the contrastive perceptual loss system 102 identifies a ground-truth signal (e.g., a digital content item) Y and a reconstruction $\hat{Y}$ of the ground-truth signal. For example, the contrastive perceptual loss system 102 generates the reconstruction $\hat{Y}$ from a generator $\mathcal{G}$ operating on an input X: $\hat{Y}=\mathcal{G}(X)$. The generator $\mathcal{G}$ may include any function approximator such as a generative neural network (e.g., a convolutional neural network). In one or more embodiments, during training, the generator $\mathcal{G}$ attempts to generate the reconstruction $\hat{Y}$ close to the ground-truth signal Y, given the input X.

In one or more embodiments, the contrastive perceptual loss system 102 utilizes an input signal X that includes a pixel labeling corresponding to L different object classes $\mathbb{R}^{H\times W\times L}$ a low-resolution image $\mathbb{R}^{\frac{H}{s}\times\frac{W}{s}\times 3}$, or a sequence of $T_{past}$ video frames $\mathbb{R}^{H\times W\times 3\times T_{past}}$. Additionally, the output includes an image $\hat{Y}\in\mathbb{R}^{H\times W\times 3}$ or a sequence of future $T_{future}$ video frames. H and W represent the height and width, respectively, of an image, and 3 represents the RGB channels of an image. In one or more embodiments, Y, $\hat{Y}\in\mathbb{R}^{H\times W\times 3}$.

According to one or more embodiments, for a given input signal X, there may not be a single ground-truth signal, but a set of perceptually plausible output signals $\mathcal{Y}$. For example, given a task of generating a digital image from a semantic label map (e.g., a segmentation mask), a "car" class label in the semantic label map may correspond to any number of distinct instances of the category that satisfy the class label. Because the desired output may be ill-defined from the input signal alone, the contrastive perceptual loss system 102 utilizes a loss function to compare the generated result $\hat{Y}$ with the ground-truth signal $Y\in\mathcal{Y}$ to take into account such ambiguity.

In one or more embodiments, the contrastive perceptual loss system 102 maximizes the lower bound of the mutual information $\mathcal{J}$ between the set of generated signals $\mathcal{G}(X)$ and the set of perceptually plausible ground-truth signals $\mathcal{Y}$, $$\mathcal{J}(\mathcal{G}(X);\mathcal{Y}) = \sum_{\hat{Y}\in\mathcal{G}(X)}\sum_{Y=\in\mathcal{Y}} P(\hat{Y},Y)\log\left(\frac{P(\hat{Y},Y)}{P(\hat{Y})P(Y)}\right)$$

in which P denotes probability distributions over random variables. The mutual information is large when the two sets are closely related.

In one or more embodiments, given a dataset $\chi=\{(X,Y)\}$ of input and output ground-truth pairs, the contrastive perceptual loss system 102 obtains the generator $\mathcal{G}^*$ with the following objective function:

$$G^* = \underset{\mathcal{G}}{\operatorname{argmax}}\,\mathbb{E}_{(X,Y)\in\chi}\mathcal{J}(\mathcal{G}(X);Y)$$

Computing the mutual information $\mathcal{J}$ can be difficult when enumerating all possible outcomes and calculating the joint probability. Accordingly, the contrastive perceptual loss system 102 modifies the objective function to approximate the mutual information.

For example, the contrastive perceptual loss system 102 first trains an encoder $\mathcal{F}$ and calculates the mutual information between output responses of the encoder as $\mathcal{J}(\mathcal{F}(\mathcal{G}(X));\mathcal{F}(\mathcal{Y}))$. Second, the contrastive perceptual loss system 102 optimizes a lower-bound patchwise contrastive perceptual loss between encoder responses for spatialized patches in the generated and ground-truth signals, $\hat{Y}$ and Y, respectively. In one or more embodiments, $\hat{y}_p$, $y_p \in \mathbb{R}^{H_{patch}\times W_{patch}\times 3}$ represents patches from the generated and ground-truth signals in the same spatial location, where $H_{patch}$ and $W_{patch}$ are the height and width of the patches, respectively. Furthermore, $\mathcal{F}:\mathbb{R}^{H_{patch}\times W_{patch}\times 3}\to\mathbb{R}^C$ represents a network that encodes patches into a unit-normalized vector representation of length V.

Additionally, $v = \mathcal{F}(\hat{y}_p) \in \mathbb{R}^C$ represents the encoded signal of a generated patch (i.e., a patch from an encoded signal), $v^+ = \mathcal{F}(y_p) \in \mathbb{R}^C$ represents the encoded signal of a corresponding patch in the ground truth signal $y_p$, and $v^- \in \mathbb{R}^C$ represents the embedding on the N other patches in the ground-truth signal (e.g., a "negative set" of patches). The contrastive perceptual loss system 102 indexes into the $n^{th}$ embedded negative patch with $v_n^- \in \mathbb{R}^C$. The contrastive perceptual loss system 102 determines the contrastive loss as the following log ratio:

$$\ell_{contrastive}(v, v^+, v^-) = -\log \frac{\exp(s(v, v^+)/\tau)}{\exp(s(v, v^+)/\tau) + \sum_n \exp(s(v, v_n^-)/\tau)}$$

where $s(v_1, v_2) = v_1^T v_2$ returns a similarity between two encoded patch signals, defined as a dot product, and T represents a scalar temperature hyperparameter. In one or more embodiments, minimizing the contrastive loss corresponds to maximizing the lower bound of the mutual information.

In one or more embodiments, the contrastive perceptual loss system 102 passes full images $\hat{Y}$ and Y into the encoder neural network $\mathcal{F}$ to produce a stack of features. A feature activation at a given spatial location and layer corresponds to a feature representation of a patch in the input image. In one or more embodiments, the size of a patch depends on the architecture of the encoder neural network and the layer of the encoder neural network. Accordingly, by taking activations at multiple layers of the encoder neural network, the contrastive perceptual loss system 102 computes the patch-wise contrastive loss at different spatial scales.

More specifically, the contrastive perceptual loss system 102 extracts $\hat{Y}$ and Y into sets of L feature tensors $\{\hat{V}_l, V_l\}_{l=1}^L$, where L is a pre-specified number of layers of a convolutional neural network $\mathcal{F}$. In one or more embodiments, each feature tensor $V_l = \mathcal{F}_l(\mathcal{F}_l(Y))$ is extracted by the $l^{th}$ layer of the convolutional neural network $\mathcal{F}$, along with a small two-layer multi-layer perceptron $\mathcal{F}_l$. Additionally, in one or more embodiments, the encoder neural network $\mathcal{F}$ above includes both the convolutional neural network $\mathcal{F}$ (a feature extraction layer) and the multi-layer perceptron $\mathcal{F}_l$ (i.e., the encoder neural network and the convolutional neural network have the same notation).

Furthermore, in one or more embodiments, the contrastive perceptual loss system 102 determines the shape of the tensor $V_l \in \mathbb{R}^{H_l \times W_l \times C_l} = \mathbb{R}^{S_l \times C_l}$ by the architecture of the encoder neural network, where $S_l = H_l \times W_l$ is the number of spatial locations of the tensor. In one or more embodiments, the contrastive perceptual loss system 102 indexes into the tensor with notation $v_l^s \in \mathbb{R}^{C_l}$, which is the feature vector at the $s^{th}$ spatial location in tensor $V_l$. The contrastive perceptual loss system 102 further determines $v_l^{S_l \setminus s} \in \mathbb{R}^{(S_l - 1) \times C_l}$ as the collection of feature vectors at all other spatial locations. Accordingly, the final contrastive loss is:

$$\mathcal{L}_{contrastive}(\hat{Y}, Y) = \sum_{l=1}^{L} \sum_{s=1}^{S_l} \ell_{contrastive}(\hat{v}_l^s, v_l^s, v_l^{S_l \setminus s})$$

Given a dataset $\chi = \{(X, Y)\}$ of input and output ground-truth pairs, the contrastive perceptual loss system 102 obtains the generator $\mathcal{G}^*$ with the objective function:

$$G^* = \underset{\mathcal{G}}{\arg\min} \max_{\mathcal{F}, \mathcal{H}} \mathbb{E}_{(X,Y) \in \chi} \mathcal{L}_{contrastive}(\mathcal{G}(X), Y)$$

In one or more embodiments in which the encoder $\mathcal{F}, \mathcal{H}$ and generator $\mathcal{G}$ are neural networks, the entire system is differentiable. Accordingly, the contrastive perceptual loss system 102 optimizes the entire system utilizing stochastic gradient descent.

As mentioned, in one or more embodiments, the contrastive perceptual loss system 102 utilizes the contrastive loss in conjunction with a discriminator loss in a generative adversarial network. For example, the contrastive perceptual loss system 102 includes a discriminator $\mathcal{D}$ in a conditional generative adversarial network cGAN that judges whether an input-output pair of $(X, \mathcal{G}(X))$ appears to belong to a dataset of input-output pairs $(X, Y) \in \chi$ with a cGAN loss:

$$\mathcal{L}_{cGAN}(X, \hat{Y}, Y) = \log \mathcal{D}_{(X,Y)} + \log(1 - \mathcal{D}_{(X,\hat{Y})})$$

The generator attempts to "fool" the discriminator. For example, the solution for the generator is found via a min-max optimization:

$$G^* = \underset{\mathcal{G}}{\arg\min} \max_{\mathcal{D}} \mathbb{E}_{(X,Y) \in \chi} \mathcal{L}_{cGAN}(X, \mathcal{G}(X), Y)$$

The resulting discriminator loss is adaptive, as the discriminator $\mathcal{D}$ is trained. In contrast to the contrastive loss, however, the discriminator analyzes the ground-truth Y and the output $\hat{Y}$ in isolation and does not compare them directly.

As described in relation to FIGS. 2 and 3A-3C, the contrastive perceptual loss system 102 performs operations for determining a contrastive perceptual loss based on an output of a generative neural network and a ground-truth reference. The operations allow the contrastive perceptual loss system 102 to accurately train the generative neural network and one or more neural networks involved in determining the contrastive perceptual loss for accurate and adaptive learning. Accordingly, the acts and operations illustrated and described above in relation to FIGS. 2 and 3A-3C provide the corresponding acts (e.g., structure) for a step for determining a contrastive loss between the synthetic digital content item and a ground-truth digital content item.

In certain embodiments, researchers conducted experiments to evaluate the accuracy of example embodiments of the contrastive perceptual loss system 102 relative to conventional systems. In particular, experiments conducted with an experimental embodiment of the contrastive perceptual loss system 102 relative to a plurality of existing models (as shown in the tables below) on a dataset of digital images ("Cityscapes"). Specifically, a first table illustrates Frechet Inception Distance ("FID") scores representing a measure of similarity between images for a plurality of models.

| Model | mIoU | accu | FID Score |
| --- | --- | --- | --- |
| GAN + Feature Matching + VGG | 41.57 | 77.43 | 59.65 |
| L1 | 21.28 | 55.52 | 133.31 |
| VGG | 42.99 | 77.84 | 73.53 |

-continued

| Model | mIoU | accu | FID Score |
|---|---|---|---|
| L1 + VGG | 40.06 | 76.70 | 82.01 |
| CPLS | 37.94 | 72.00 | 110.261 |
| CPLS + L1 | 37.96 | 75.31 | 87.73 |
| CPLS + GAN | 40.76 | 77.02 | 51.748 |

In the table above, "GAN," "Feature Matching," and "VGG" include neural networks and/or losses as described by Karen Simonyan and Andrew Zisserman in "Very deep convolutional networks for large-scale image recognition," in NIPS (2015). Furthermore, the "L1" includes a function as described, for example, by Alexey Dosovitskiy and Thomas Brox in "Inverting visual representations with convolutional networks," in Proceedings of the IEEE conference on computer vision and pattern recognition (2016). Furthermore, the contrastive perceptual loss system 102 is indicated as "CPLS" in the table above.

The table also includes the mean Intersection-over-Union ("mIoU") and the pixel accuracy ("accu") for measuring segmentation accuracy. As shown, the contrastive perceptual loss system 102 provides competitive or improved performance over other models individually. Additionally, the contrastive perceptual loss system 102 provides a better FID score when utilized in combination with a GAN discriminator.

Although the foregoing embodiments describe a variety of example architectures with regard to neural networks and machine learning models, it will be appreciated that the contrastive perceptual loss system 102 can utilize a variety of different neural network and architectures. For example, although the generative neural network is described above in some examples as a convolutional neural network, in some embodiments, the generative neural network is a recurrent neural network, such as an LSTM. Similarly, although the encoder neural network is described in some example embodiments as having a particular number or type of layers, the contrastive perceptual loss system 102 can utilize a variety of numbers and types of neural network layers in different orders or arrangements. Similarly, although many of the foregoing examples are described with regard to a generative neural network, the contrastive perceptual loss system 102 can operate with regard to a variety of function approximators or synthesis/generative machine learning models.

Figure 4:
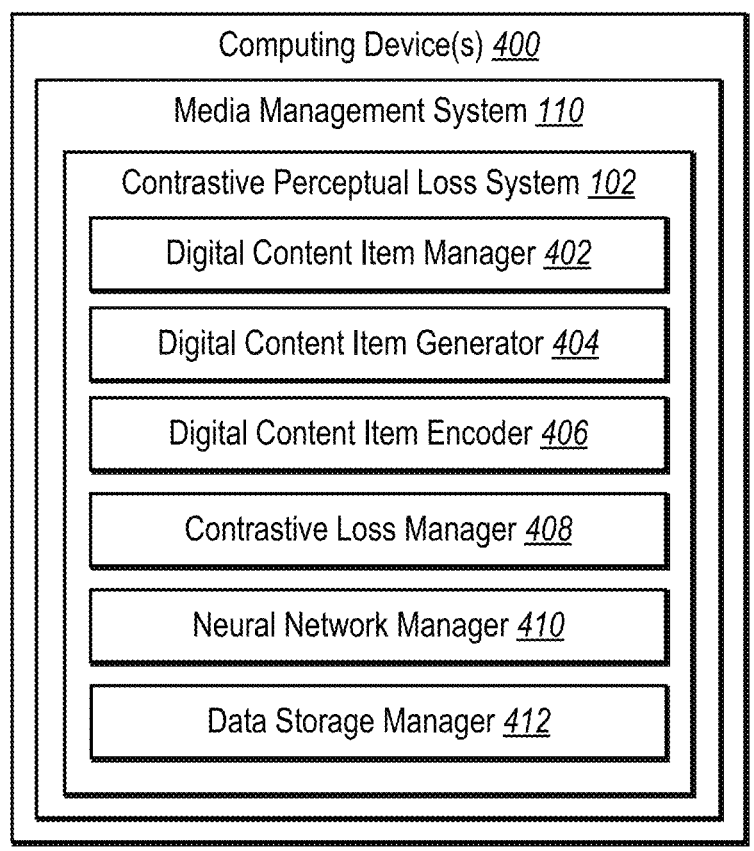
FIG. 4 illustrates a diagram of the contrastive perceptual loss system of FIG. 1 in accordance with one or more implementations.

FIG. 4 illustrates a detailed schematic diagram of an embodiment of the contrastive perceptual loss system 102 described above. As shown, the contrastive perceptual loss system 102 is implemented in the media management system 110 on computing device(s) 400 (e.g., a client device and/or server device as described in FIG. 1, and as further described below in relation to FIG. 6). Additionally, the contrastive perceptual loss system 102 can include, but is not limited to, a digital content item manager 402, a digital content item generator 404, a digital content item encoder 406, a contrastive loss manager 408, a neural network manager 410, and a data storage manager 412. In one or more embodiments, the contrastive perceptual loss system 102 is implemented on any number of computing devices. For example, the contrastive perceptual loss system 102 can be implemented in a distributed system of server devices for managing digital content. The contrastive perceptual loss system 102 can also be implemented within one or more additional systems. Alternatively, the contrastive perceptual loss system 102 can be implemented on a single computing device such as a single client device.

Figure 5:
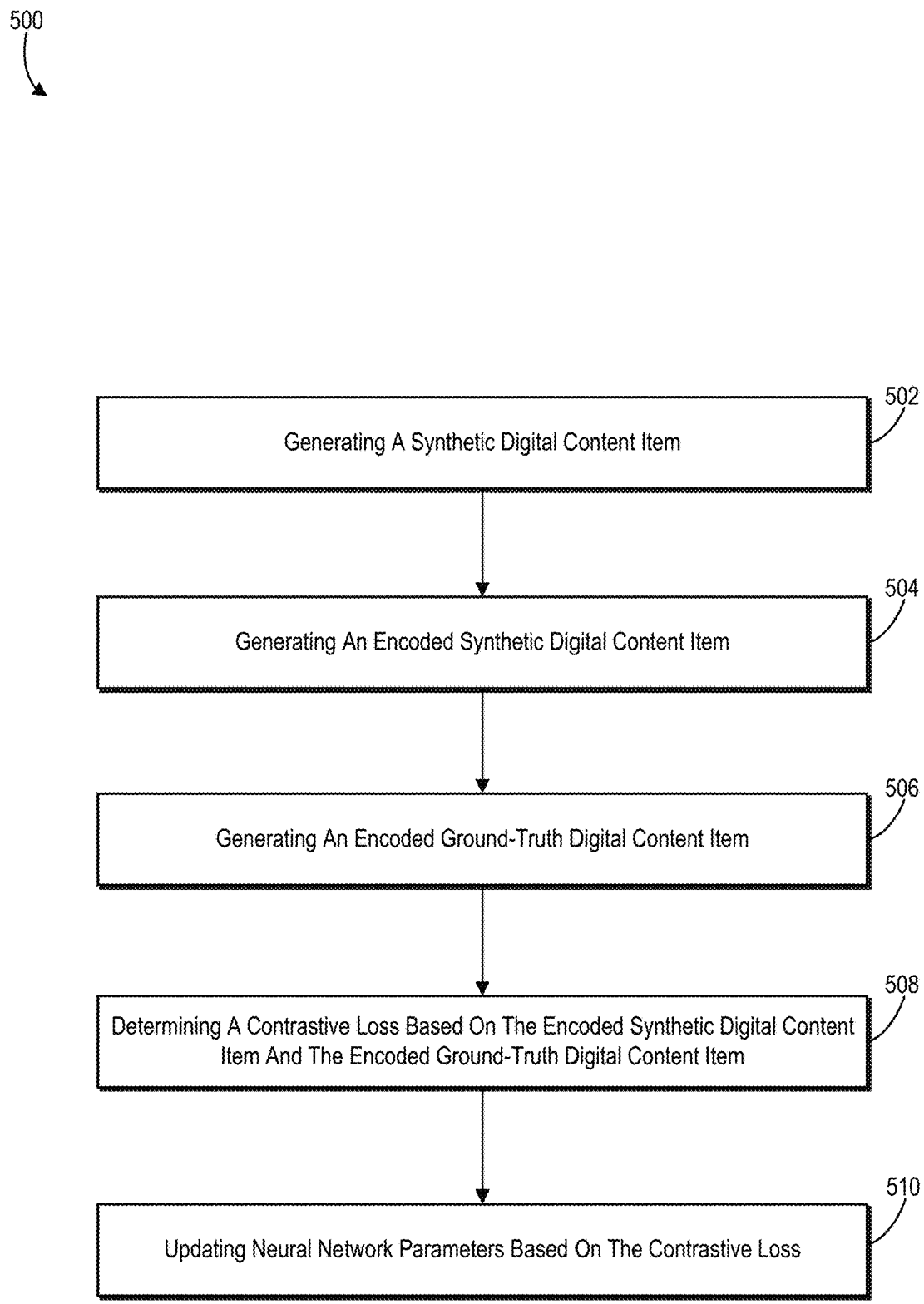
FIG. 5 illustrates a flowchart of a series of acts for determining a contrastive perceptual loss in accordance with one or more implementations.

In one or more embodiments, each of the components of the contrastive perceptual loss system 102 is in communication with other components using any suitable communication technologies. Additionally, the components of the contrastive perceptual loss system 102 can be in communication with one or more other devices including other computing devices of a user, server devices (e.g., cloud storage devices), licensing servers, or other devices/systems. It will be recognized that although the components of the contrastive perceptual loss system 102 are shown to be separate in FIG. 6, any of the subcomponents may be combined into fewer components, such as into a single component, or divided into more components as may serve a particular implementation. Furthermore, although the components of FIG. 5 are described in connection with the contrastive perceptual loss system 102, at least some of the components for performing operations in conjunction with the contrastive perceptual loss system 102 described herein may be implemented on other devices within the environment.

The components of the contrastive perceptual loss system 102 can include software, hardware, or both. For example, the components of the contrastive perceptual loss system 102 include one or more instructions stored on a computer-readable storage medium and executable by processors of one or more computing devices (e.g., the computing device(s) 400). When executed by the one or more processors, the computer-executable instructions of the contrastive perceptual loss system 102 cause the computing device(s) 400 to perform the operations described herein. Alternatively, the components of the contrastive perceptual loss system 102 include hardware, such as a special purpose processing device to perform a certain function or group of functions. Additionally, or alternatively, the components of the contrastive perceptual loss system 102 include a combination of computer-executable instructions and hardware.

Furthermore, the components of the contrastive perceptual loss system 102 performing the functions described herein with respect to the contrastive perceptual loss system 102 may, for example, be implemented as part of a stand-alone application, as a module of an application, as a plug-in for applications, as a library function or functions that may be called by other applications, and/or as a cloud-computing model. Thus, the components of the contrastive perceptual loss system 102 may be implemented as part of a stand-alone application on a personal computing device or a mobile device. Alternatively, or additionally, the components of the contrastive perceptual loss system 102 may be implemented in any application that provides document management, including, but not limited to CREATIVE CLOUD®, PHOTOSHOP®, or LIGHTROOM®. The foregoing are either registered trademarks or trademarks of Adobe Inc. in the United States and/or other countries.

As mentioned, the contrastive perceptual loss system 102 includes a digital content item manager 402. The digital content item manager 402 manages digital content items generated by and/or modified by the contrastive perceptual loss system 102. For example, the digital content item manager 402 received digital content items from client devices for modifying the digital content items (e.g., by applying visual effects) via client applications on the client devices. The digital content item manager 402 also manages digital content items generated by a generative neural network (e.g., received from the digital content item generator 404). Additionally, the digital content item manager 402 manages ground-truth representations of the digital content items for processing via one or more neural networks and/or for determining contrastive losses.

In one or more embodiments, the contrastive perceptual loss system 102 includes a digital content item generator 404 to manage the generation of digital content items utilizing a generative neural network. For example, the digital content item generator 404 utilizes a generative neural network to generate digital content items (e.g., synthetic digital content items) from guide inputs (e.g., from semantic label maps, low resolution images, or noisy digital images). To illustrate, the digital content item generator 404 manages inputs and outputs of the generative neural network. In one or more embodiments, the digital content item generator 404 also generates guide inputs for the generative neural network to process.

Furthermore, the contrastive perceptual loss system 102 includes a digital content item encoder 406 to generate encoded representations of digital content items. For instance, the digital content item encoder 406 utilizes an encoder neural network to generate one or more feature representations (e.g., in one or more encoding iterations) of a synthetic digital content item and one or more feature representations of a ground-truth digital content item. Additionally, the digital content item encoder 406 utilizes the encoder neural network to project the feature representation(s) of each digital content item into a different dimension space to generate encoded representations of the digital content items.

In one or more additional embodiments, the contrastive perceptual loss system 102 includes a contrastive loss manager 408 to determine contrastive losses associated with digital content items. Specifically, the contrastive loss manager 408 utilizes a patchwise comparison to determine a contrastive loss based on a synthetic digital content item and a corresponding ground-truth digital content item. For example, the contrastive loss manager 408 samples patches from the encoded representations of digital content items and then compares the sampled patches to determine perceptual distances.

The contrastive perceptual loss system 102 also includes a neural network manager 410 to manage a plurality of neural networks associated with generating synthetic digital content and determining contrastive losses. For example, the neural network manager 410 manages a generative neural network, an encoder neural network, a classification neural network, and a discriminator neural network. Additionally, the neural network manager 410 trains the neural networks utilizing one or more losses (e.g., a contrastive loss and/or a discriminator loss) by updating parameters of the neural networks.

Additionally, the contrastive perceptual loss system 102 includes a data storage manager 412 (that comprises a non-transitory computer memory/one or more memory devices) that stores and maintains data associated with generating and modifying digital content items. For example, the data storage manager 412 stores information associated with generating digital content items including ground-truth digital content items, guide inputs, and synthetic digital content items. The data storage manager 412 also stores information associated with determining one or more losses including, but not limited to, inputs and outputs of neural networks, encoded representations of digital content items, a contrastive loss, and a discriminator loss.

Turning now to FIG. 5, this figure shows a flowchart of a series of acts 500 of modifying neural networks for synthetic digital content generation utilizing contrastive perceptual loss. While FIG. 5 illustrates acts according to one embodiment, alternative embodiments may omit, add to, reorder, and/or modify any of the acts shown in FIG. 5. The acts of FIG. 5 can be performed as part of a method. Alternatively, a non-transitory computer readable medium can comprise instructions, that when executed by one or more processors, cause a computing device to perform the acts of FIG. 5. In still further embodiments, a system can perform the acts of FIG. 5.

As shown, the series of acts 500 includes an act 502 of generating a synthetic digital content item. For example, act 502 involves generating, utilizing a generative neural network, a synthetic digital content item based on a guide input. In one or more embodiments, the synthetic digital content item includes a synthetic digital image. Furthermore, in one or more embodiments, the guide input includes a semantic label map comprising one or more class labels for one or more regions of a digital image. In one or more embodiments, the synthetic digital content item includes a synthetic digital audio track. Act 502 can involve generating the guide input from the ground-truth digital content item.

The series of acts 500 also includes an act 504 of generating an encoded synthetic digital content item. For example, act 504 involves generating an encoded synthetic digital content item by processing the synthetic digital content item utilizing an encoder neural network. Act 504 can involve utilizing a feature extraction layer of the encoder neural network to extract a first feature representation of the synthetic digital content item.

The series of acts 500 further includes an act 506 of generating an encoded ground-truth digital content item. For example, act 506 involves generating an encoded ground-truth digital content item by processing a ground-truth digital content item corresponding to the guide input utilizing the encoder neural network. Act 506 can involve utilizing the feature extraction layer of the encoder neural network to extract a second feature representation of the ground-truth digital content item.

Additionally, the series of acts 500 includes an act 508 of determining a contrastive loss based on the encoded synthetic digital content item and the encoded ground-truth digital content item. For example, act 508 involves determining a contrastive loss by comparing a sampled patch (or synthetic patch) in the encoded synthetic digital content item with a plurality of sampled patches in the encoded ground-truth digital content item.

Act 508 can involve comparing the sampled patch in the encoded synthetic digital content item to a positive patch in the encoded ground-truth digital content item, wherein a location of the positive patch in the encoded ground-truth digital content item corresponds to a location of the sampled patch in the encoded synthetic digital content item. Act 508 can then involve comparing the sampled patch in the encoded synthetic digital content item to a negative patch in the encoded ground-truth digital content item, wherein a location of the negative patch in the encoded ground-truth digital content item does not correspond to the location of the sampled patch in the encoded synthetic digital content item. In one or more embodiments, act 508 involves sampling a plurality of negative patches and comparing the plurality of negative patches to the sampled patch in the encoded synthetic digital content item.

Act 508 can involve determining a location of the synthetic patch in the encoded synthetic digital content item. Act 508 can also involve sampling the positive patch at a location in the encoded ground-truth digital content item corresponding to the location of the synthetic patch in the encoded synthetic digital content item. Furthermore, act 508 can involve sampling the plurality of negative patches at a plurality of locations in the encoded ground-truth digital content item that do not correspond to the location of the synthetic patch in the encoded synthetic digital content item.

Act 508 can involve determining perceptual distances between the synthetic patch in the encoded synthetic digital content item and the positive patch and the plurality of negative patches in the encoded ground-truth digital content item by comparing the synthetic patch to the positive patch and the plurality of negative patches. For example, act 508 can involve determining a first perceptual distance between the sampled patch in the encoded synthetic digital content item and the positive patch in the encoded ground-truth digital content item. Act 508 can also involve determining a second perceptual distance between the sampled patch in the encoded synthetic digital content item and the negative patch in the encoded ground-truth digital content item. Act 508 can then involve determining the contrastive loss based on the first perceptual distance and the second perceptual distance.

Furthermore, act 508 can involve determining a first set of intermediate feature representations of the synthetic digital content item. For example, act 508 can involve generating, utilizing the encoder neural network, a first synthetic feature representation and a second synthetic feature representation from the synthetic digital content item. Act 508 can also involve determining a second set of intermediate feature representations of the ground-truth digital content item. For example, act 508 can involve generating, utilizing the encoder neural network, a first ground-truth feature representation and a second ground-truth feature representation from the ground-truth digital content item. Additionally, act 508 can involve determining a multilayer patch-wise contrastive loss based on the first set of intermediate feature representations and the second set of intermediate feature representations. For example, act 508 can involve comparing a first sampled patch in the first synthetic feature representation to a first set of sampled patches in the first ground-truth feature representation. Act 508 can also involve comparing a second sampled patch in the second synthetic feature representation to a second set of sampled patches in the second ground-truth feature representation.

Act 508, or an additional act, can involve converting, utilizing a multilayer perceptron layer of the encoder neural network, the encoded synthetic digital content item and the encoded ground-truth digital content item to a space having a lower dimension than the encoded synthetic digital content item and the encoded ground-truth digital content item. For example, act 508 (or act 504 and act 506) can involve projecting, utilizing the encoder neural network, the first feature representation and the second feature representation from a first dimension space to a second dimension space, wherein the first dimension space has a higher dimension than the second dimension space. Act 508, or an additional act, can then involve selecting the sampled patch in the encoded synthetic digital content item and the plurality of sampled patches in the encoded ground-truth digital content item in the space having the lower dimension.

Furthermore, the series of acts 500 includes an act 510 of updating neural network parameters based on the contrastive loss. For example, act 510 involves updating parameters of the generative neural network and parameters of the encoder neural network based on the contrastive loss. Act 510 can involve jointly learning the parameters of the generative neural network and the parameters of the encoder neural network via backpropagation of the contrastive loss. Additionally, act 510 can involve updating the parameters of the generative neural network and the parameters of the encoder neural network based on the contrastive loss to decrease the first perceptual distance and increase the second perceptual distance.

The series of acts 500 can further include receiving a new guide input corresponding to a new ground-truth digital content item. The series of acts 500 can then include generating, based on the new guide input, a new synthetic digital content item utilizing the generative neural network with updated parameters according to the contrastive loss. Additionally, the series of acts 500 can include providing the new ground-truth digital content item for display on a display device.

The series of acts 500 can also include determining, based on the synthetic digital content item, a discriminator loss utilizing a discriminator neural network. The series of acts 500 can then include updating the parameters of the generative neural network based on the discriminator loss in addition to the contrastive loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
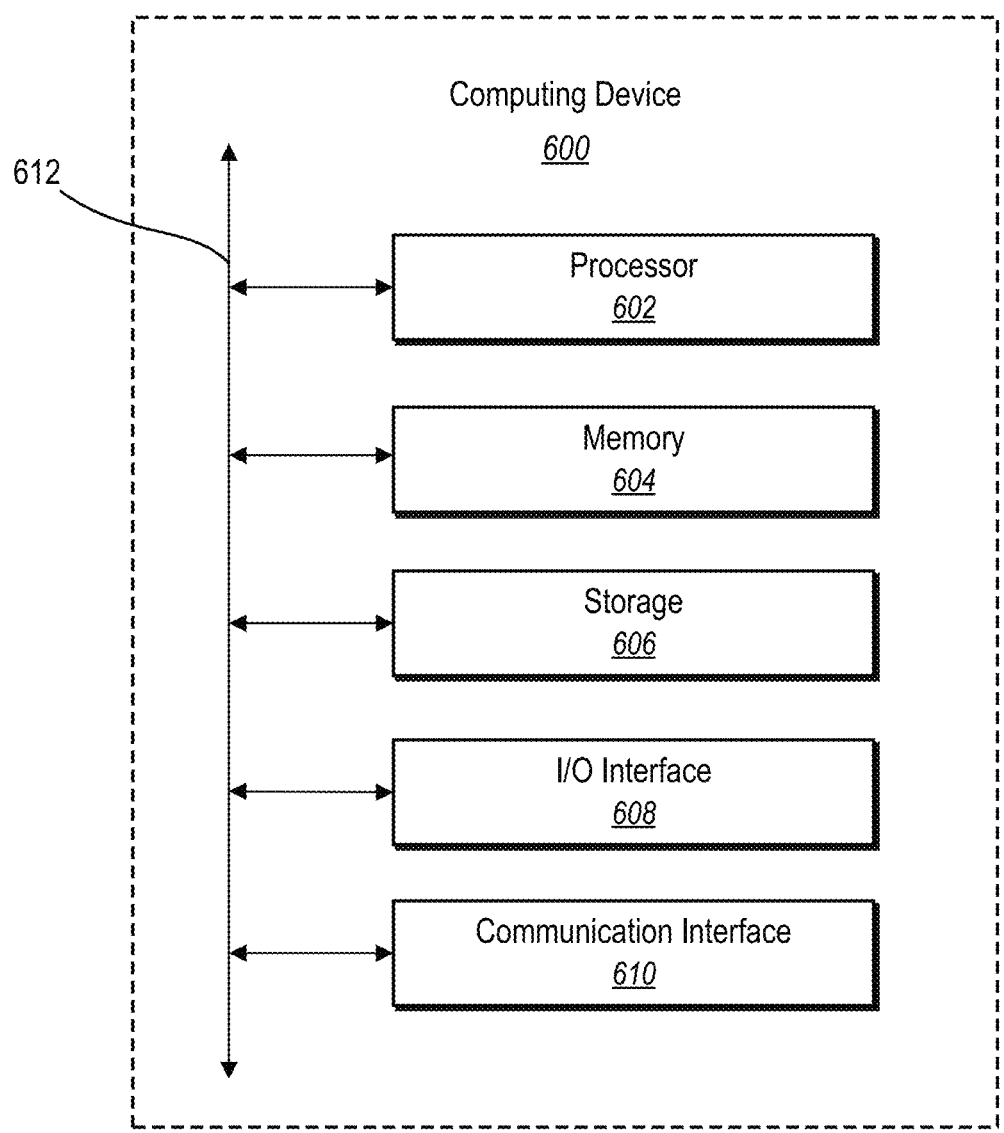
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the system(s) of FIG. 1. As shown by FIG. 6, the computing device 600 can comprise a processor 602, a memory 604, a storage device 606, an I/O interface 608, and a communication interface 610, which may be communicatively coupled by way of a communication infrastructure 612. In certain embodiments, the computing device 600 can include fewer or more components than those shown in FIG. 6. Components of the computing device 600 shown in FIG. 6 will now be described in additional detail.

In one or more embodiments, the processor 602 includes hardware for executing instructions, such as those making up a computer program. As an example, and not by way of limitation, to execute instructions for dynamically modifying workflows, the processor 602 may retrieve (or fetch) the instructions from an internal register, an internal cache, the memory 604, or the storage device 606 and decode and execute them. The memory 604 may be a volatile or non-volatile memory used for storing data, metadata, and programs for execution by the processor(s). The storage device 606 includes storage, such as a hard disk, flash disk drive, or other digital storage device, for storing data or instructions for performing the methods described herein.

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example, and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 610 may facilitate communications with various types of wired or wireless networks. The communication interface 610 may also facilitate communications using various communication protocols. The communication infrastructure 612 may also include hardware, software, or both that couples components of the computing device 600 to each other. For example, the communication interface 610 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
generate, utilizing a generative neural network, a synthetic digital content item within a first dimension space based on a guide input;
generate an encoded synthetic digital content item within a second dimension space by processing the synthetic digital content item utilizing an encoder neural network, the second dimension space corresponding to encodings in a lower dimension space than the first dimension space;
generate an encoded ground-truth digital content item within the second dimension space by processing a ground-truth digital content item corresponding to the guide input utilizing the encoder neural network;
sample, from a first feature vector within the second dimension space, a patch from the encoded synthetic digital content item based on a corresponding spatial location in the synthetic digital content item;
sample, from a second feature vector within the second dimension space, a plurality of patches from the encoded ground-truth digital content item based on corresponding spatial locations in the ground-truth digital content item;
determine a contrastive loss by comparing the sampled patch from the first feature vector of the encoded synthetic digital content item in the second dimension space with the plurality of sampled patches from the second feature vector of the encoded ground-truth digital content item in the second dimension space; and
update parameters of the generative neural network and parameters of the encoder neural network based on the contrastive loss.

2. The non-transitory computer readable storage medium as recited in claim 1, further comprising instructions that, when executed by the at least one processor, cause the computing device to determine the contrastive loss by:
comparing the sampled patch in the first feature vector of the encoded synthetic digital content item to a positive patch in the second feature vector of the encoded ground-truth digital content item, wherein a location of the positive patch in the second feature vector of the encoded ground-truth digital content item corresponds to a location of the sampled patch in the first feature vector of the encoded synthetic digital content item; and
comparing the sampled patch in the first feature vector of the encoded synthetic digital content item to a negative patch in the second feature vector of the encoded ground-truth digital content item, wherein a location of the negative patch in the second feature vector of the encoded ground-truth digital content item does not correspond to the location of the sampled patch in the first feature vector the encoded synthetic digital content item.

3. The non-transitory computer readable storage medium as recited in claim 2, further comprising instructions that, when executed by the at least one processor, cause the computing device to determine the contrastive loss by:
determining a first set of intermediate feature representations of the synthetic digital content item;
determining a second set of intermediate feature representations of the ground-truth digital content item; and
determining a multilayer patch-wise contrastive loss based on the first set of intermediate feature representations and the second set of intermediate feature representations.

4. The non-transitory computer readable storage medium as recited in claim 2, further comprising instructions that, when executed by the at least one processor, cause the computing device to determine the contrastive loss by:
determining a first perceptual distance between the sampled patch in the first feature vector of the encoded synthetic digital content item and the positive patch in the second feature vector of the encoded ground-truth digital content item;
determining a second perceptual distance between the sampled patch in the first feature vector of the encoded synthetic digital content item and the negative patch in the second feature vector of the encoded ground-truth digital content item; and
determining the contrastive loss based on the first perceptual distance and the second perceptual distance.

5. The non-transitory computer readable storage medium as recited in claim 4, further comprising instructions that, when executed by the at least one processor, cause the computing device to update the parameters of the generative neural network and the parameters of the encoder neural network based on the contrastive loss by updating the parameters of the generative neural network and the parameters of the encoder neural network based on the contrastive loss to decrease the first perceptual distance and increase the second perceptual distance.

6. The non-transitory computer readable storage medium as recited in claim 1, further comprising instructions that, when executed by the at least one processor, cause the computing device to:
   receive a new guide input corresponding to a new ground-truth digital content item;
   generate, based on the new guide input, a new synthetic digital content item utilizing the generative neural network with the parameters updated based on the contrastive loss; and
   provide the new ground-truth digital content item for display on a display device.

7. The non-transitory computer readable storage medium as recited in claim 1, further comprising instructions that, when executed by the at least one processor, cause the computing device to:
   generate a first feature representation from the synthetic digital content item and a second feature representation from the ground-truth digital content item;
   convert, utilizing a multilayer perceptron layer of the encoder neural network, the first feature representation to the first feature vector in the second dimension space and the second feature representation to the second feature vector in the second dimension space; and
   select the sampled patch in the first feature vector of the encoded synthetic digital content item and the plurality of sampled patches in the second feature vector of the encoded ground-truth digital content item in the second dimension space.

8. The non-transitory computer readable storage medium as recited in claim 1, wherein the synthetic digital content item comprises a synthetic digital image or a synthetic digital audio track.

9. The non-transitory computer readable storage medium as recited in claim 1, further comprising instructions that, when executed by the at least one processor, cause the computing device to generate the guide input from the ground-truth digital content item.

10. A system comprising:
    a memory device comprising:
      a ground-truth digital content item;
      a guide input corresponding to the ground-truth digital content item; and
      a generative neural network and an encoder neural network; and
    one or more servers configured to cause the system to:
      generate, utilizing the generative neural network, a synthetic digital content item based within a first dimension space on a guide input;
      generate, utilizing the encoder neural network, an encoded synthetic digital content item within a second dimension space from the synthetic digital content item and an encoded ground-truth digital content item within the second dimension space from the ground-truth digital content item, the second dimension space corresponding to encodings in a lower dimension space than the first dimension space;
      sample a synthetic patch from a first feature vector corresponding to the encoded synthetic digital content item within the second dimension space based on a corresponding spatial location in the synthetic digital content item;
      sample a positive patch and a plurality of negative patches from a second feature vector corresponding to the encoded ground-truth digital content item within the second dimension space based on corresponding spatial locations in the ground-truth digital content item;
      determine a contrastive loss by comparing the synthetic patch in the first feature vector of the encoded synthetic digital content item to the positive patch and the plurality of negative patches in the second feature vector of the encoded ground-truth digital content item; and
      updating parameters of the generative neural network and parameters of the encoder neural network based on the contrastive loss.

11. The system as recited in claim 10, wherein the one or more servers are further configured to cause the system to sample the positive patch by:
    determining a location of the synthetic patch in the first feature vector of the encoded synthetic digital content item in the second dimension space; and
    sampling the positive patch at a location in the second feature vector of the encoded ground-truth digital content item corresponding to the location of the synthetic patch in the first feature vector of the encoded synthetic digital content item.

12. The system as recited in claim 10, wherein the one or more servers are further configured to cause the system to sample the plurality of negative patches by:
    determining a location of the synthetic patch from the first feature vector of the encoded synthetic digital content item in the second dimension space; and
    sampling the plurality of negative patches at a plurality of locations in the second feature vector of the encoded ground-truth digital content item that do not correspond to the location of the synthetic patch in the first feature vector of the encoded synthetic digital content item.

13. The system as recited in claim 10, wherein the one or more servers are further configured to cause the system to determine the contrastive loss by:
    determining perceptual distances between the synthetic patch in the first feature vector of the encoded synthetic digital content item and the positive patch and the plurality of negative patches in the second feature vector of the encoded ground-truth digital content item by comparing the synthetic patch to the positive patch and the plurality of negative patches; and
    determining the contrastive loss based on the perceptual distances.

14. The system as recited in claim 10, wherein the one or more servers are further configured to cause the system to update the parameters of the generative neural network and the parameters of the encoder neural network by jointly learning the parameters of the generative neural network and the parameters of the encoder neural network via backpropagation of the contrastive loss.

15. The system as recited in claim 10, wherein the one or more servers are further configured to cause the system to determine the contrastive loss by:
    generating, utilizing the encoder neural network, a first synthetic feature representation and a second synthetic feature representation from the synthetic digital content item;
    generating, utilizing the encoder neural network, a first ground-truth feature representation and a second ground-truth feature representation from the ground-truth digital content item; and determine the contrastive loss by:
  comparing a first sampled patch in the first synthetic feature representation to a first set of sampled patches in the first ground-truth feature representation; and
  comparing a second sampled patch in the second synthetic feature representation to a second set of sampled patches in the second ground-truth feature representation.

16. The system as recited in claim 10, wherein the one or more servers are further configured to cause the system to generate the encoded synthetic digital content item from the synthetic digital content item and the encoded ground-truth digital content item from the ground-truth digital content item by:
  determining, utilizing the encoder neural network, a first feature representation of the synthetic digital content item and a second feature representation of the ground-truth digital content item; and
  projecting, utilizing the encoder neural network, the first feature representation to the first feature vector in the second dimension space and the second feature representation to the second feature vector in the second dimension space.

17. The system as recited in claim 10, wherein the one or more servers are further configured to cause the system to:
  determine, based on the synthetic digital content item, a discriminator loss utilizing a discriminator neural network; and
  update the parameters of the generative neural network based on the discriminator loss in addition to the contrastive loss.

18. A method comprising:
  generating, utilizing a generative neural network, a synthetic digital content item within a first dimension space based on a guide input;
  generating an encoded synthetic digital content item within a second dimension space by processing the synthetic digital content item utilizing an encoder neural network, the second dimension space corresponding to encodings in a lower dimension space than the first dimension space;
  generating an encoded ground-truth digital content item within the second dimension space by processing a ground-truth digital content item corresponding to the guide input utilizing the encoder neural network;
  sampling, from a first feature vector within the second dimension space, a patch from the encoded synthetic digital content item based on a corresponding spatial location in the synthetic digital content item;
  sampling, from a second feature vector within the second dimension space, a plurality of patches from the encoded ground-truth digital content item based on corresponding spatial locations in the ground-truth digital content item;
  determine a contrastive loss by comparing the sampled patch from the first feature vector of the encoded synthetic digital content item in the second dimension space with the plurality of sampled patches from the second feature vector of the encoded ground-truth digital content item in the second dimension space; and
  updating parameters of the generative neural network based on the contrastive loss.

19. The method as recited in claim 18, wherein the synthetic digital content item comprises a synthetic digital image.

20. The method as recited in claim 18, wherein the synthetic digital content item comprises a synthetic digital audio track.

* * * * *